(12) United States Patent
Goto

(10) Patent No.: US 11,993,385 B2
(45) Date of Patent: May 28, 2024

(54) METHOD OF CONTROLLING DRONE WITH AIRBAG AND DRONE WITH AIRBAG

(71) Applicant: MATSUYA R&D., LTD., Ono (JP)

(72) Inventor: Hidetaka Goto, Fukui (JP)

(73) Assignee: MATSUYA R&D CO., LTD., Ono (JP)

( * ) Notice: Subject to any disclaimer, the term of this patent is extended or adjusted under 35 U.S.C. 154(b) by 999 days.

(21) Appl. No.: 16/960,055

(22) PCT Filed: Nov. 12, 2018

(86) PCT No.: PCT/JP2018/041846
§ 371 (c)(1),
(2) Date: Jul. 3, 2020

(87) PCT Pub. No.: WO2019/142470
PCT Pub. Date: Jul. 25, 2019

(65) Prior Publication Data
US 2021/0053691 A1    Feb. 25, 2021

(30) Foreign Application Priority Data

Jan. 22, 2018    (JP) .................................. 2018-008349

(51) Int. Cl.
*B64D 25/00* (2006.01)
*B64C 39/02* (2023.01)
*B64U 10/13* (2023.01)

(52) U.S. Cl.
CPC ............ *B64D 25/00* (2013.01); *B64C 39/024* (2013.01); *B64D 2201/00* (2013.01); *B64U 10/13* (2023.01)

(58) Field of Classification Search
CPC .... B64D 25/00; B64D 2201/00; B64D 25/14; B64C 39/024; B64C 1/062; B64U 10/13
See application file for complete search history.

(56) References Cited

U.S. PATENT DOCUMENTS

| | | | |
|---|---|---|---|
| 8,979,023 B1 * | 3/2015 | Wang | B64C 39/024 244/100 A |
| 9,613,539 B1 * | 4/2017 | Lindskog | G08G 5/0069 |
| 9,834,311 B2 * | 12/2017 | Sugaya | B64C 39/024 |
| 9,908,629 B2 * | 3/2018 | Erickson | B64D 17/72 |

(Continued)

FOREIGN PATENT DOCUMENTS

| CN | 104875888 A | * | 9/2015 |
| DE | 102015218456 A1 | * | 3/2017 |

(Continued)

*Primary Examiner* — Benjamin P Lee
(74) *Attorney, Agent, or Firm* — BACON&THOMAS,PLLC

(57) ABSTRACT

To provide a drone with an airbag that can eliminate the danger of the drone injuring a person in the event of the drone crashing mid-flight including during takeoff and landing. The present invention is equipped with an airbag 3 for reducing the impact of a crashed drone 2 colliding with a person. Prior to the drone 2 taking off, the airbag 3 can be inflated by being supplied with gas. Once the drone 2 has taken off and reached a required altitude, the airbag 3 deflates due to the gas being exhausted. When the drone 2 is mid-flight and in danger of crashing, the airbag 2 can be inflated instantly by being supplied with gas. Prior to the drone 2 landing, the airbag 3 can be inflated by being supplied with gas.

12 Claims, 30 Drawing Sheets

(56) References Cited

U.S. PATENT DOCUMENTS

| | | | | |
|---|---|---|---|---|
| 10,336,453 | B2* | 7/2019 | Chan | B64D 1/08 |
| 11,046,443 | B2* | 6/2021 | Tanriover | E05B 81/08 |
| 11,286,051 | B2* | 3/2022 | Yagihashi | B64D 17/80 |
| 11,591,110 | B2* | 2/2023 | Nakamura | B64D 17/72 |
| 2016/0167793 | A1* | 6/2016 | Geneste | B60R 21/231 |
| | | | | 244/121 |
| 2016/0332739 | A1* | 11/2016 | Wong | B64C 39/024 |
| 2016/0368610 | A1* | 12/2016 | Erickson | B64D 17/80 |
| 2017/0203843 | A1* | 7/2017 | Chan | B64D 9/003 |
| 2018/0022310 | A1* | 1/2018 | Olson | B64C 25/56 |
| | | | | 244/100 A |
| 2019/0016461 | A1* | 1/2019 | Chang | B64C 27/08 |
| 2019/0039743 | A1* | 2/2019 | Tanriover | E05B 81/08 |
| 2019/0382120 | A1* | 12/2019 | Nakamura | B64D 25/00 |
| 2020/0039466 | A1* | 2/2020 | Goto | B64U 70/83 |
| 2020/0062386 | A1* | 2/2020 | Zhang | B64C 27/28 |
| 2020/0231291 | A1* | 7/2020 | Wakatsuki | B64C 39/024 |
| 2020/0239136 | A1* | 7/2020 | Nakamura | B64D 45/06 |
| 2020/0339278 | A1* | 10/2020 | Nakamura | B64D 17/80 |
| 2023/0012473 | A1* | 1/2023 | Nakamura | H01M 50/249 |

FOREIGN PATENT DOCUMENTS

| | | | | |
|---|---|---|---|---|
| FR | 2841533 A1 * | 1/2004 | | B64C 25/56 |
| JP | 5857326 B1 | 2/2016 | | |
| JP | 5875093 B1 | 3/2016 | | |
| JP | 2018079911 A | 5/2018 | | |

* cited by examiner

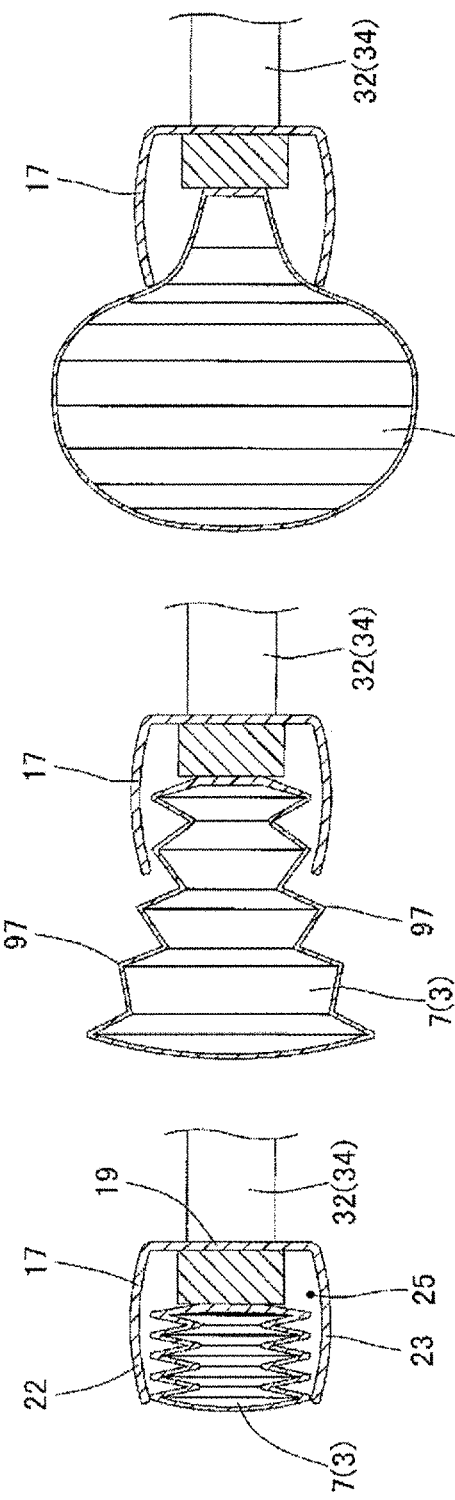

METHOD OF CONTROLLING DRONE WITH AIRBAG AND DRONE WITH AIRBAG

TECHNICAL FIELD

The present invention relates to a method of controlling a drone with an airbag and a drone with an airbag. More specifically, the present invention relates to a method of controlling a drone with an airbag in such a manner as to effectively prevent such a danger that the drone injures the person in the case that the crashed drone collides with the other things such as a person or a building structure, when the drone during the flight becomes an uncontrollable state under the influence of a trouble in an air frame, an abnormal weather or a radio disturbance and is crashed and a drone with an airbag.

BACKGROUND ART

In the drone in which an arm part is protruded from a central mounting part accommodating a camera therein, and a rotary vane is provided at a front side position of the arm part, the drone may be crashed by the trouble of the air frame such as a breakage of a motor rotating the rotary vane and a deterioration of a battery, or may be crashed under the influence of the abnormal weather such as blast, and may be further crushed by the radio disturbance in the case that the drone is affected by any noise or flies to an area where the radio wave does not reach, that is, the drone may be crashed due to various causes (patent literature 1 and patent literature 2).

In particular, when the drone takes off the ground and flies away and when the drone lands on the ground, the state of the drone greatly changes, and the drone tends to be unbalanced due to a lack of a lift force and an influence of an air flow and has a high risk of being crashed.

When the drone is crashed as mentioned above, there has been such a danger that the crashed drone injures the person in a case where the crashed drone collides with the other things such as the person or the building structure.

The inventor of the present invention has provided a drone with an airbag by Japanese Patent No. 6217054 (patent literature 3). The drone with the airbag is structured such that the drone is provided with the airbag which absorbs a shock generated when the drone is crashed and collides with the other things, and is provided with an inflation control portion which controls inflation of the airbag. The airbag can inflate by the gas supplied on the basis of a control by the inflation control portion, and the inflation is carried out by the control before the drone collides with the other things.

Thus, according to the drone with the airbag, when the drone becomes uncontrollable due to a trouble of the air frame, the abnormal weather or the radio disturbance, for example, in a case where the drone reaches a predetermined altitude and is during the flight, the airbag has an enough time to be inflated to a desired level until the drone is crashed. As a result, there has been an advantage of preventing a risk that the drone injures the person in a case where the drone collides with the other things such as the person and the building structure, as much as possible. However, when the drone with the airbag becomes uncontrollable before reaching the predetermined altitude after taking off the ground, or when the drone with the airbag becomes uncontrollable due to the causes mentioned above during the reduction of the altitude for landing, the airbag may not have enough time to be inflated to the desired level. In this case, the airbag does not function due to lack of inflation, and the drone may be crashed, so that there has been a risk that it is impossible to avoid a danger of the drone injuring the person.

In addition, even if the airbag can be inflated desirably when the drone becomes uncontrollable due to the cause before taking off the ground and reaching the predetermined altitude, or during the period when the drone reduces the altitude for landing on the ground, the airbag was supposed to be inflated by an inflator. In this case, since the inflator is a disposable element for only one use and expensive, the inflator should be replaced every time when the drone takes off and lands on the ground in view of an economical efficiency.

Patent literature 4 describes a drone with an airbag to which a balloon in an inflated state is attached so as to surround the drone like a ring in a horizontal surface. According to the drone with the airbag, even when the drone becomes uncontrollable and is crashed due to the cause before reaching the predetermined altitude after taking off the ground, or when the drone becomes uncontrollable and is crashed due to the cause during the period when the drone with the airbag reduces the altitude for landing on the ground, it will be possible to avoid a danger that the drone injures the person. However, the drone with the airbag is in a state in which the airbag is kept inflated even after the drone reaches the predetermined altitude and is during the flight. Accordingly, the airbag is exposed to an air resistance, thereby lowering a flight performance of the drone. In addition, the airbag in the inflated state is an obstacle and causes the drone to be crashed.

CITATION LIST

Patent Literature

Patent Literature 1: Japanese Patent No. 5857326
Patent Literature 2: Japanese Patent No. 5875093
Patent Literature 3: Japanese Patent No. 6217054
Patent Literature 4: Japanese Patent Unexamined Publication No. 2016-165987

SUMMARY OF INVENTION

Technical Problem

The present invention is developed by taking into consideration the conventional problem mentioned above, and an object of the present invention is to provide a method of controlling a drone with an airbag which can prevent a danger that the drone injures a person as much as possible in a case where the drone is crashed when the drone takes off and lands on the ground and during the period when the drone reaches a predetermined altitude and flies, and collides with the other things such as a person and a building structure, and is hard to cause a flight performance of the drone to be lowered after the drone reaches the predetermined altitude, and the drone with the airbag.

Solution to Problem

In order to achieve the problem mentioned above, the present invention employs the following means.

More specifically, the method of controlling the drone with the airbag according to the present invention is a method of controlling a drone with an airbag in which the drone is provided with the airbag for absorbing a shock when the drone is crashed and collides with the other things, the method comprising the steps of: making the airbag be inflated by supplying a gas to the airbag prior to the drone taking off the ground; making the airbag in a deflated state by discharging the gas in the airbag on the basis of the control of a first inflation control portion after the drone reaches the predetermined altitude; making the airbag be inflated by supplying the gas to the airbag in the deflated state prior to the drone landing on the ground; and making the airbag be instantaneously inflated by supplying the gas to the airbag in the deflated state when a danger of the drone being crashed is generated during the flight of the drone. In a first aspect of the drone with the airbag according to the present invention, the drone is provided with an airbag which absorbs a shock when the drone is crashed and collides with the other things, and a first inflation control portion and a second inflation control portion which control the inflation of the airbag. Further, the gas is supplied to the airbag and the airbag can be inflated on the basis of a control of the first inflation control portion prior to the drone taking off the ground. The gas in the airbag is discharged on the basis of the control of the first inflation control portion after the drone reaches the predetermined altitude, whereby the airbag is in the deflated state. In the meantime, the gas is supplied to the airbag in the deflated state on the basis of the control of the first inflation control portion prior to the drone landing on the ground, whereby the airbag can be inflated. Further, during the flight of the drone, the airbag in the deflated state can be inflated instantaneously by the gas supply on the basis of the control of the second inflation control portion. Further, the inflation on the basis of the control is performed before the drone collides with the other things.

A second aspect of the drone with the airbag according to the present invention is further provided with a pressure regulating means for regulating a pressure so as to prevent a gas pressure of the airbag from going beyond an allowable value in a case where the second inflation control portion is activated during the period when the first inflation control portion is activated, in the first aspect.

A third aspect of the drone with the airbag according to the present invention is structured such that the first inflation control portion is constructed by a motor-driven pump, and is adapted to make the airbag be inflated on the basis of a gas supply action by the pump and make the airbag be deflated on the basis of a gas discharge action by the pump, and the second inflation control portion is constructed by including an inflator and a trigger device, and is adapted to make the airbag in the deflated state be instantaneously inflated on the basis of the gas supply from the inflator, in the first aspect or the second aspect.

A fourth aspect of the drone with the airbag according to the present invention is structured such that the airbag is constructed by a first airbag which surrounds the drone in a horizontal surface, and a second airbag which surrounds the drone in a vertical surface, the first airbag and the second airbag can be inflated simultaneously by the gas supply action on the basis of the control of the first inflation control portion or the second inflation control portion, and can be deflated simultaneously by the gas discharge action on the basis of the control of the first inflation control portion, in the first aspect or the second aspect.

In a fifth aspect of the drone with the airbag according to the present invention, the drone is provided with an airbag which absorbs a shock when the drone is crashed and collides with the other things, and a first inflation control portion and a second inflation control portion which control the inflation of the airbag. Further, the gas is supplied to the airbag and the airbag can be inflated on the basis of a control of the first inflation control portion prior to the drone taking off the ground. The gas in the airbag is discharged on the basis of the control of the first inflation control portion after the drone reaches the predetermined altitude, whereby the airbag is in the deflated state. In the meantime, the gas is supplied to the airbag in the deflated state on the basis of the control of the first inflation control portion prior to the drone landing on the ground, whereby the airbag can be inflated. Further, during the flight of the drone, the airbag in the deflated state can be inflated instantaneously by the gas supply on the basis of the control of the second inflation control portion. Further, the inflation on the basis of the control is performed before the drone collides with the other things. The airbag is constructed by a first airbag which surrounds the drone in a horizontal surface, and a second airbag which surrounds the drone in a vertical surface, the second airbag is arranged in each of right and left sides of the drone, and the right and left second airbags are rotatable in a clockwise direction or a counterclockwise direction around a vertical axis.

In a sixth aspect of the drone with the airbag according to the present invention, the drone is provided with an airbag which absorbs a shock when the drone is crashed and collides with the other things, and a first inflation control portion and a second inflation control portion which control the inflation of the airbag. Further, the gas is supplied to the airbag and the airbag can be inflated on the basis of a control of the first inflation control portion prior to the drone taking off the ground. The gas in the airbag is discharged on the basis of the control of the first inflation control portion after the drone reaches the predetermined altitude, whereby the airbag is in the deflated state. In the meantime, the gas is supplied to the airbag in the deflated state on the basis of the control of the first inflation control portion prior to the drone landing on the ground, whereby the airbag can be inflated. Further, during the flight of the drone, the airbag in the deflated state can be inflated instantaneously by the gas supply on the basis of the control of the second inflation control portion. Further, the inflation on the basis of the control is performed before the drone collides with the other things. The airbag is constructed only by a first airbag which surrounds the drone in a horizontal surface, or includes the first airbag, and the first airbag is arranged in a plurality of stages at desired intervals in a vertical direction.

In a seventh aspect of the drone with the airbag according to the present invention, the drone is provided with an airbag which absorbs a shock when the drone is crashed and collides with the other things, and a first inflation control portion and a second inflation control portion which control the inflation of the airbag. Further, the gas is supplied to the airbag and the airbag can be inflated on the basis of a control of the first inflation control portion prior to the drone taking off the ground. The gas in the airbag is discharged on the basis of the control of the first inflation control portion after the drone reaches the predetermined altitude, whereby the airbag is in the deflated state. In the meantime, the gas is supplied to the airbag in the deflated state on the basis of the control of the first inflation control portion prior to the drone landing on the ground, whereby the airbag can be inflated. Further, during the flight of the drone, the airbag in the deflated state can be inflated instantaneously by the gas supply on the basis of the control of the second inflation control portion. Further, the inflation on the basis of the control is performed before the drone collides with the other things. The airbag is constructed only by a second airbag which surrounds the drone in a vertical surface, or includes the second airbag, and the second airbag is arranged in a plurality of stages at desired intervals in a horizontal direction.

An eighth aspect of the drone with the airbag according to the present invention is structured such that the pressure regulating means is adapted to stop the gas supply by the first inflation device, in the second aspect.

A ninth aspect of the drone with the airbag according to the present invention is structured such that the pressure regulating means is an automatic relief valve provided in the airbag, in the second aspect.

Effect of the Invention

According to the present invention, when the drone during the flight becomes the uncontrollable state and is crashed due to the influence of the trouble in the air frame, the abnormal weather and the radio disturbance, including the taking-off time and the landing time, it is possible to effectively prevent the danger that the crashed drone injures the person in a case where the crashed drone collides with the other things such as the person and the building structure, by the inflated airbag.

As described above, the state of the drone changes greatly when the drone takes off the ground and flies away and when the drone lands on the ground, so that the drone tends to be unbalanced and has high risk to be crashed due to the lack of the lift force and the influence of the air flow. Taking the risk into consideration, in the drone with the airbag according to the present invention, since the airbag is previously set to the inflated state prior to the drone taking off and landing on the ground, it is possible to effectively prevent the crashed drone from injuring the person by the airbag in the inflated state, in a case where the crashed drone collides with the other things such as the person or the building when the drone becomes uncontrollable state and is crashed when taking off and landing on the ground.

Further, the airbag in the inflated state when the drone with the airbag takes off the ground becomes the deflated state by the discharge of the gas in the airbag after the drone reaches the predetermined altitude. Therefore, the airbag does not lower the flight performance of the drone after reaching the predetermined altitude, as is different from the drone with the airbag according to the patent literature 4.

Further, in a case where the drone with the airbag is provided with the pressure regulating means, the pressure regulating means regulates the pressure so that the gas pressure in the airbag does not go beyond the allowable value in a case where the second inflation control portion is activated during the activation of the first inflation control, for inflating the airbag prior to the taking off and landing on the ground of the drone with the airbag. Therefore, there is no fear that the airbag ruptures. Of course, in a case where the airbag has sufficient room to be inflated, the drone with the airbag may not be provided with the pressure regulating means.

BRIEF DESCRIPTION OF DRAWINGS

FIGS. 29A, 29B and 29C are cross sectional views showing a state in which a first airbag formed into a bellows shape and constructed foldable is held in a first holding part in a deflated state, and a process of the first airbag being inflated.

DESCRIPTION OF EMBODIMENTS

Embodiment 1

Figure 1:
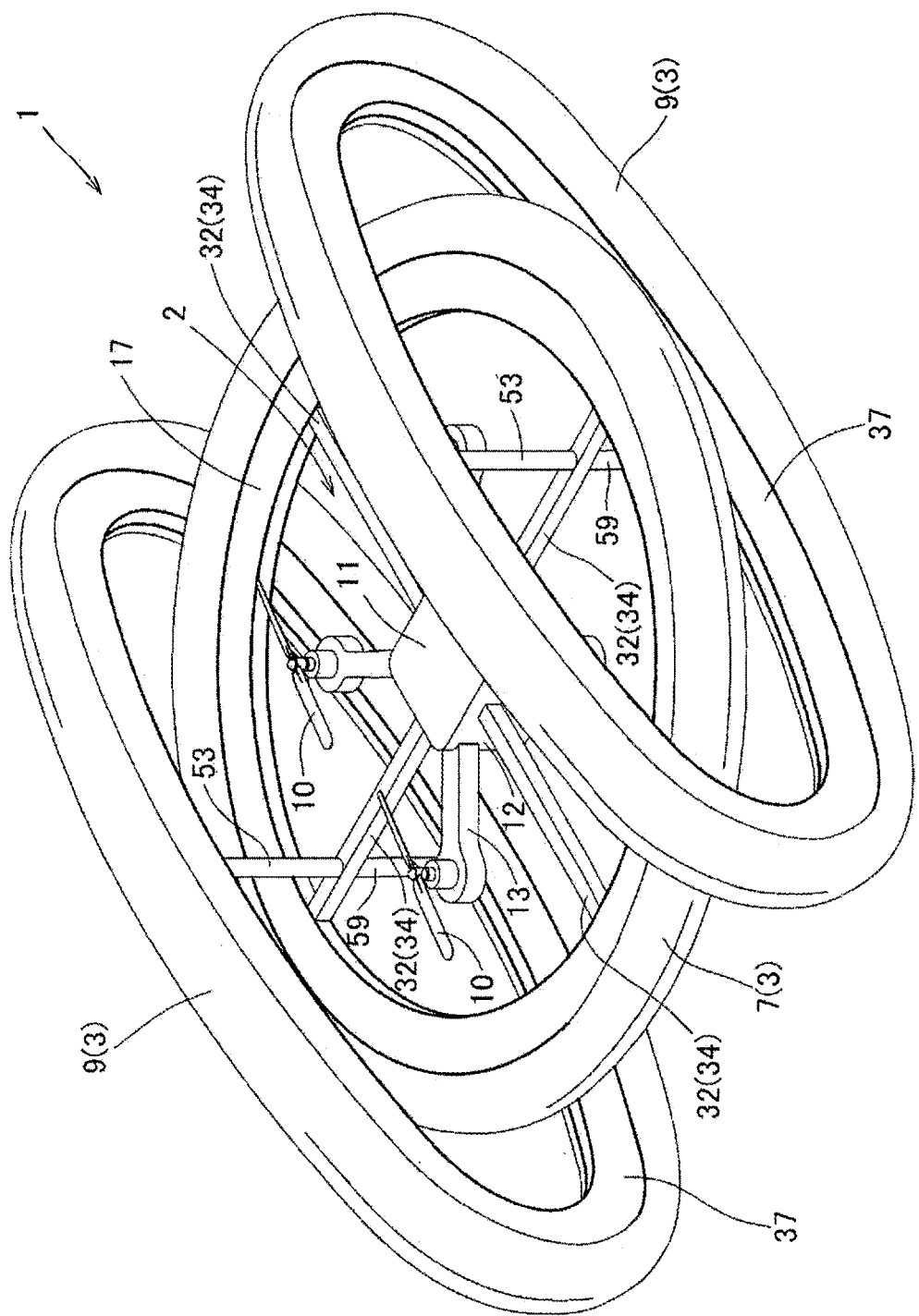
FIG. 1 is a perspective view showing a drone with an airbag according to the present invention in a state in which the airbag is inflated.
Figure 2:
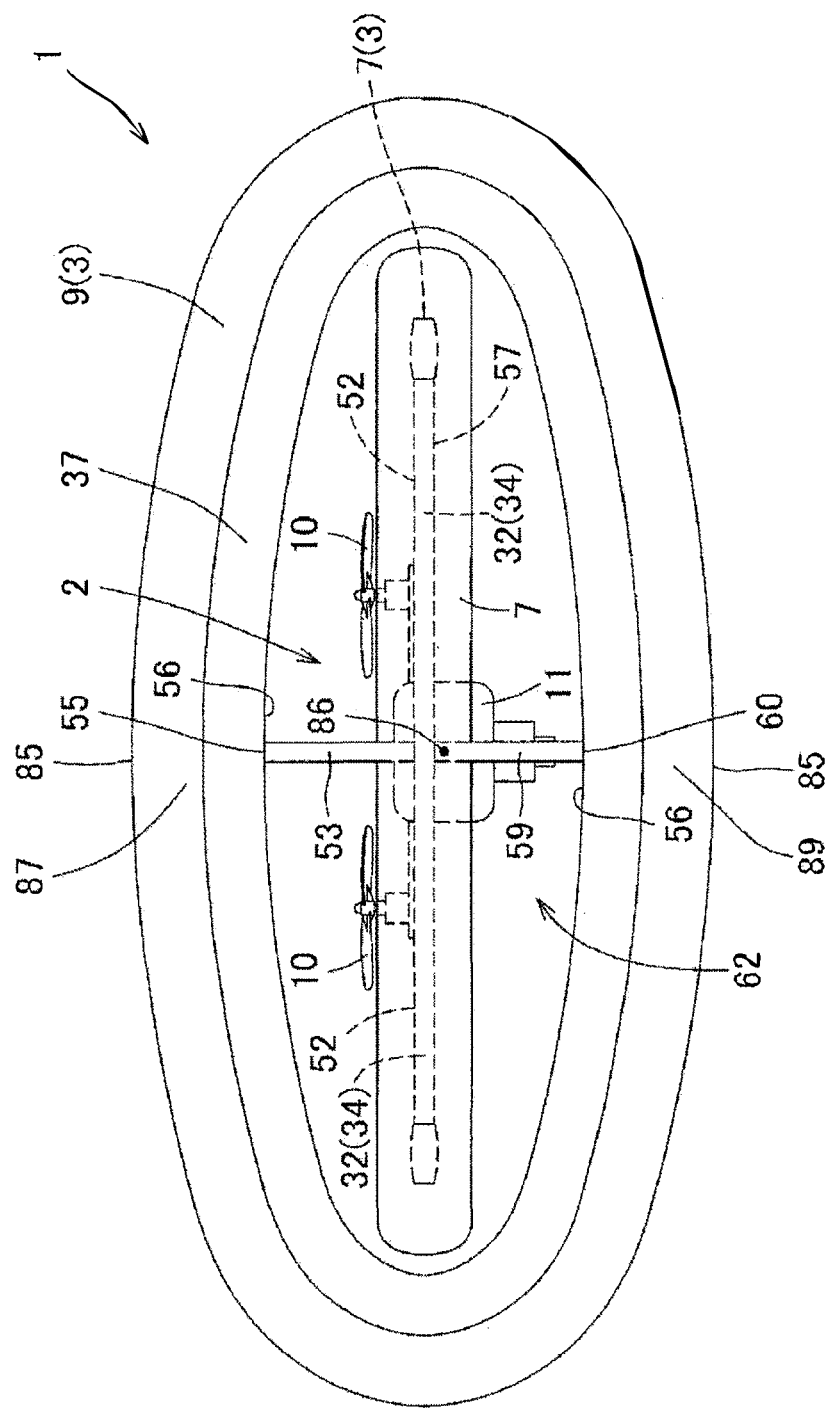
FIG. 2 is a side elevational view of the same.
Figure 3:
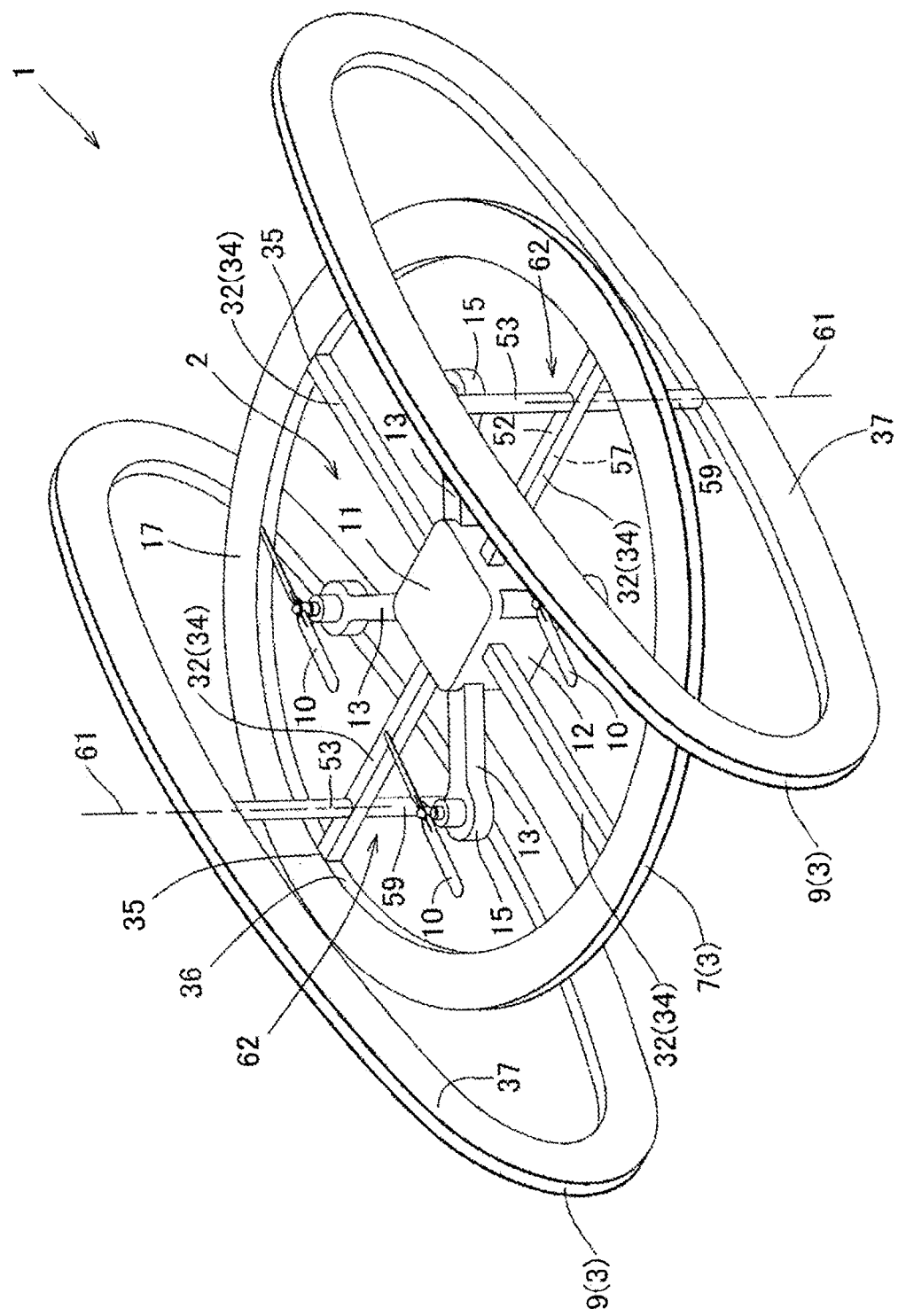
FIG. 3 is a perspective view showing the drone with the airbag according to the present invention in a state in which the airbag is deflated.

FIGS. 1 to 7 show a drone with an airbag 1 for executing a method of controlling a drone with an airbag according to the present invention. The drone with the airbag 1 is provided in a drone 2 with an airbag 3 for absorbing a shock when the drone 2 is crashed and collides with the other things, and is provided with a first inflation control portion 5 (FIG. 10) and a second inflation control portion 6 (FIG. 10) which controls inflation of the airbag 3. Further, gas (air, carbon dioxide and nitrogen gas) is supplied to the airbag 3 on the basis of the first control portion 5 prior to the drone 2 taking off the ground, and the airbag 3 can be accordingly inflated, for example, as shown in FIGS. 1 to 2. After the drone 2 reaches a predetermined altitude, the gas within the airbag 3 is discharged on the basis of the control of the first inflation control portion 5, and the airbag 3 becomes accordingly in a deflated state, for example, as shown in FIG. 3.

Further, the gas is supplied to the airbag 3 in the deflated state on the basis of the control of the first control portion 5 prior to the drone 2 landing on the ground, and the airbag 3 can be accordingly inflated. Further, during the flight of the drone 2, the airbag 3 in the deflated state can be instantaneously inflated by the gas supply on the basis of the control of the second inflation control portion 6, and the inflation on the basis of the control is performed before the drone 2 collides with the other things.

Further, a pressure regulating means is provided for regulating the pressure so that a gas pressure of the airbag 3 does not go beyond an allowable value in a case where the second inflation control portion 6 is activated during the activation of the first inflation control portion 5. The airbag 3 is constructed by a first airbag 7 which surrounds the drone 2 in a horizontal surface, and second airbags 9 which surround the drone 2 in a vertical surface, as shown in FIG. 1 in the present embodiment, and the second airbags 9 are respectively provided in right and left sides of the drone 2.

The drone 2 is provided with a rotary vane 10 which generates a lift force, as shown in FIGS. 1 to 3 in the present embodiment, and has a central mounting part 11 at the center portion thereof. In the central mounting part 11, there are accommodated a pump constructing the first inflation control portion 5 and supplying the gas by a driven motor and an inflator and a trigger device constructing the second inflation control portion 6, in addition to a camera. The second inflation control portion 6 is provided with a detecting means (not shown) which automatically detect an uncontrollable state of the drone 2 when the drone 2 during the flight becomes uncontrollable due to a trouble in an air frame and the influence of an abnormal weather and a radio disturbance, and a means (not shown) for activating the inflator on the basis of a detection signal of the detecting means before colliding with the other things such as the person.

Figure 4:
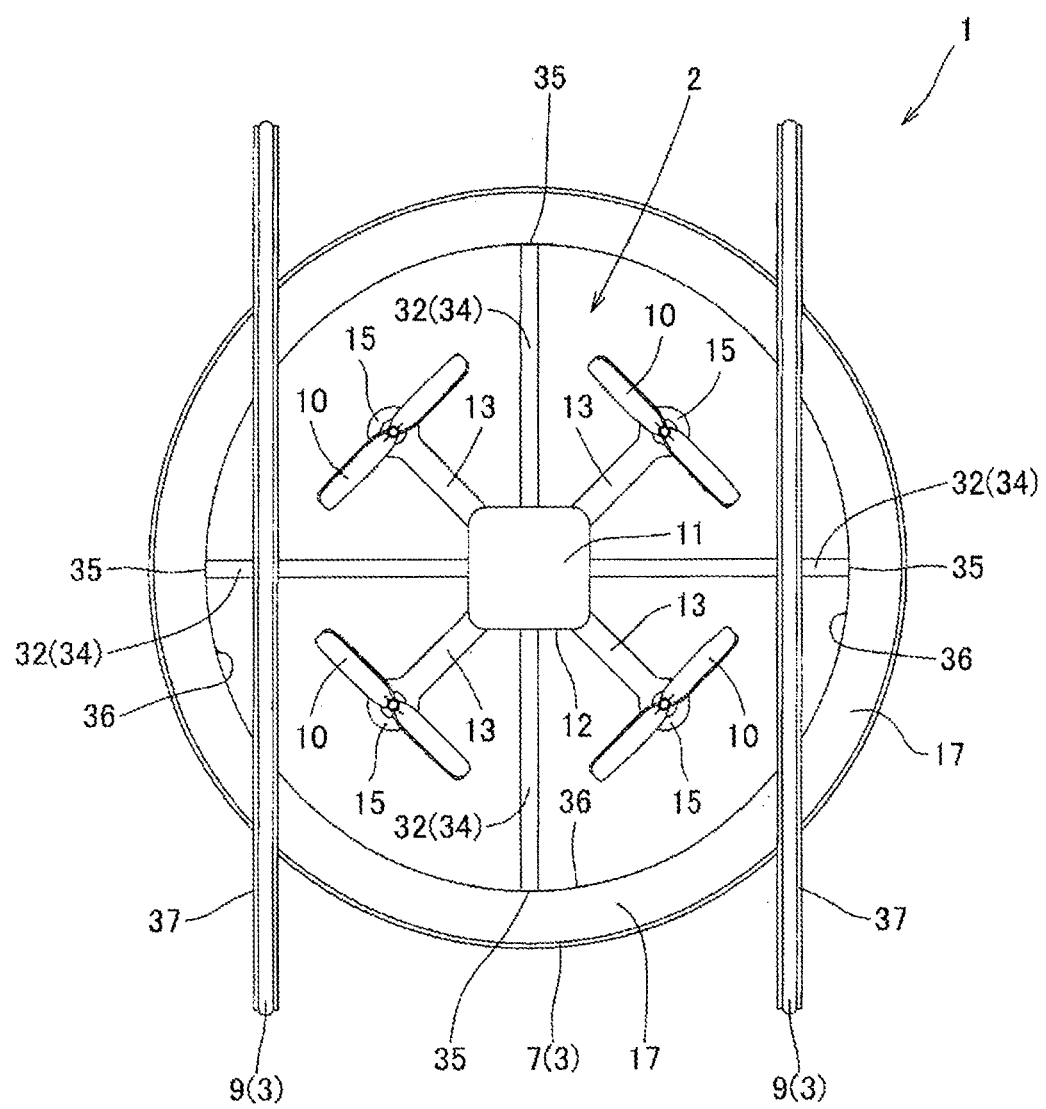
FIG. 4 is a plan view of the same.
Figure 5:
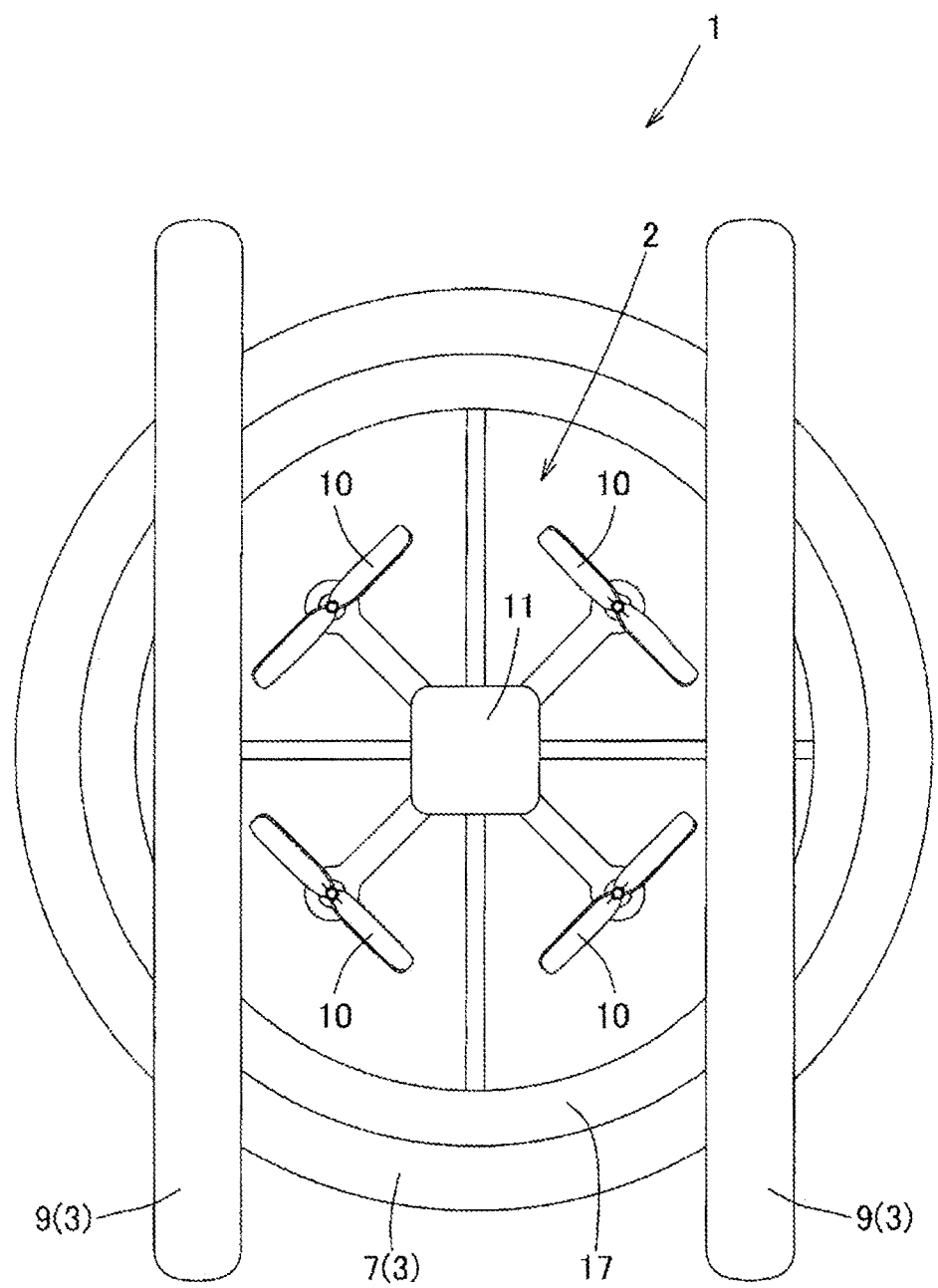
FIG. 5 is a plan view showing the drone with the airbag according to the present invention in a state in which the airbag is inflated.

Four arm parts 13, 13, 13 and 13 are radially provided in a protruding manner in a side surface portion 12 of the central mounting part 11 at an angle pitch of about 90 degree in the horizontal surface, as shown in FIGS. 1 and 3 to 4. A length of each of the arm parts 13 is set to be approximately the same length, the rotary vane 10 rotatable around a vertical axis 16 (FIG. 6) is provided in a front side position 15 of each of the arm parts 13, and a lift force is generated by the rotation of the rotary vane 10.

Figure 8A:
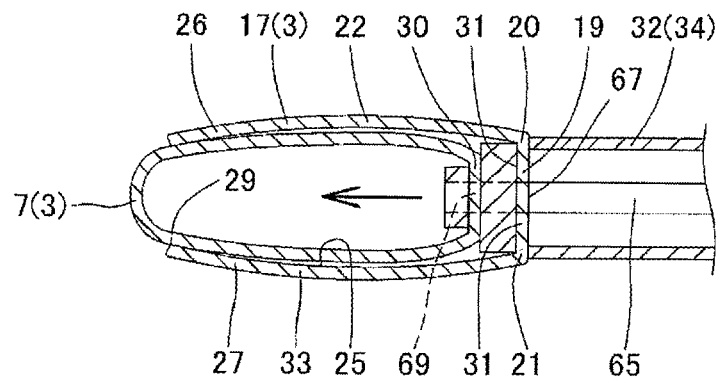
FIGS. 8A and 8B are cross sectional views showing a state in which a first airbag is accommodated in a first holding part in a deflated state, and a cross sectional view showing a state in which the first airbag is inflated.

Further, as shown in FIGS. 1 and 2 to 4, a first holding part 17 having a circular ring shape is arranged so as to surround the drone 2 in the horizontal surface while putting the central mounting part 11 at the center. The first holding part 17 is formed into a flat circular ring shape existing in the horizontal surface as shown in FIGS. 1 and 3 to 4 in the present embodiment. The first holding part 17 is more specifically structured, as shown in FIG. 8A, such that an upper piece 22 and a lower piece 33 protruding comparatively long outward as seen in the horizontal surface are provided in a protruding manner in upper and lower ends 20 and 21 of a base plate part 19 having a circular ring shape in a state of facing each other with the same length, and an accommodation part 25 having a flat U-shaped form as seen in the horizontal surface in a transverse section is formed by the upper piece 22 and the lower piece 33. The accommodation part 25 has such a shape that an inlet part 29 arranged between a front side part 26 of the upper piece 22 and a front side part 27 of the lower piece 33 is somewhat narrowed.

Figure 8B:
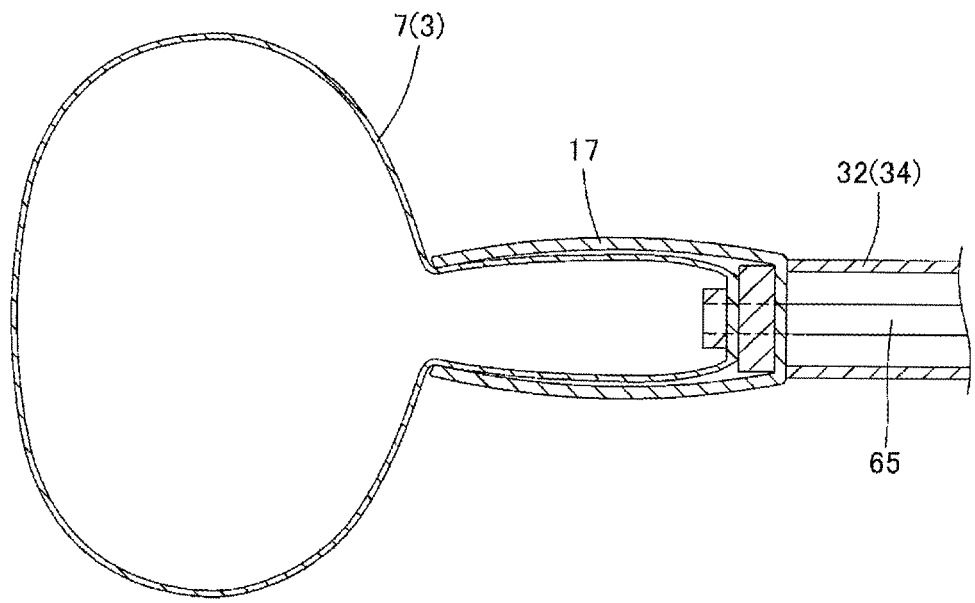

Further, a first airbag 7 (one embodiment of the airbag 3) is accommodated in the accommodation part 25 as shown in FIG. 8A, the first airbag 7 being capable of being inflated elastically and deflated elastically, and a base part 30 thereof is fixed to a bottom part 31 of the accommodation part 25. The first airbag 7 is adapted to be inflated so as to protrude toward an outer side (a direction shown by an arrow in FIG. 8A) of the first holding part 17 as seen in the horizontal surface, as shown in FIG. 8B in the present embodiment. A protruding amount is appropriately set according to a shape and a size of the drone in such a manner as to effectively prevent a danger that the drone 2 injures the person when the drone 2 collides with the other things such as the person, as mentioned later.

The first holding part 17 is arranged via a first support part 32 which is provided in a protruding manner in the central mounting part 11, as shown in FIGS. 3 to 4 in the present embodiment, and is substantially provided in the central mounting part 11. The first support part 32 is constructed as an arm-shaped support member 34 for supporting the first holding part 17 in the present embodiment. The arm-shaped support member 34 is provided in a protruding manner in the side surface portion 12 of the central mounting part 11 in such a manner as to bisect a portion between the adjacent arm parts 13 and 13 respectively between the adjacent arm parts 13 and 13 in the horizontal surface. Further, each of front ends 35 of each of the arm-shaped support members 34 is coupled to an inner peripheral surface part 36 of the base plate part 19 (FIG. 8A) of the first holding part 17. The coupling can be achieved by using various known means such as various engaging means, for example, screw fixing and welding. Therefore, the first holding part 17 is substantially provided in the central mounting part 11 via the first support part 32 as described above.

Figure 9A:
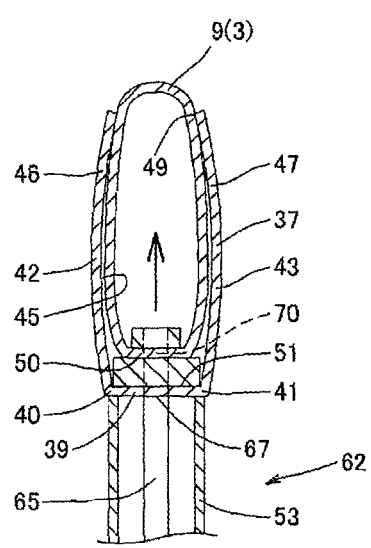
FIGS. 9A and 9B are cross sectional views showing a state in which a second airbag is accommodated in a second holding part in a deflated state, and a cross sectional view showing a state in which the second airbag is inflated.

Further, in the present embodiment, as shown in FIGS. 1 and 2 to 4, second holding parts 37 and 37 are provided in right and left sides of the central mounting part 11 so as to form a parallel state, the second holding parts 37 and 37 surrounding the first support part 32 (the arm-shaped support member 34 in the present embodiment) and the first airbag 7 in the inflated state in a vertical surface. The right and left second holding parts 37 and 37 are both formed into a flat oval ring shape which exists in the vertical surface and is formed long in a horizontal direction. The second holding part 37 is more specifically provided with a left side piece 42 and a right side piece 43 protruding comparatively long outward as seen in the vertical surface in left and right ends 40 and 41 of a base plate part 39 having an oval ring shape in a state of facing each other with the same length, as shown in FIG. 9A. An accommodation part 45 formed into a flat U-shaped form in the vertical surface in a transverse section is formed by the left side piece 42, the right side piece 43 and the base plate part 39.

Figure 9B:
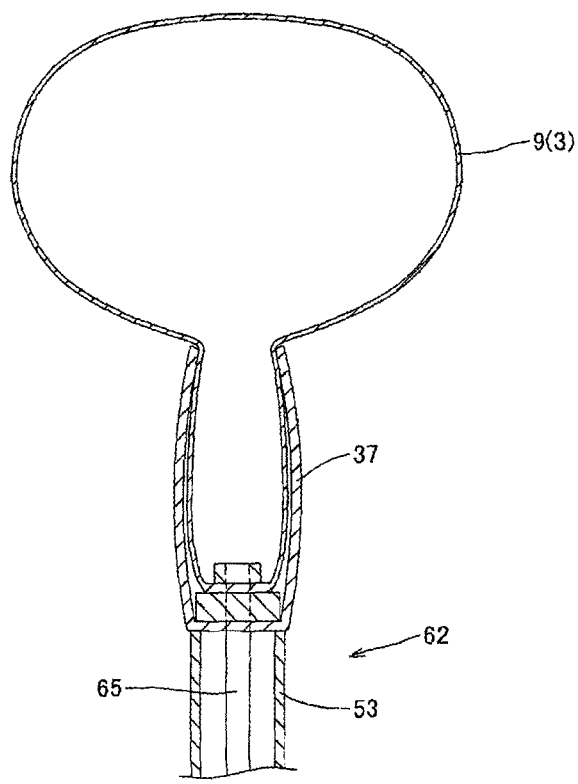

The accommodation part 45 has such a shape that an inlet part 49 arranged between a front side part 46 of the left side piece 42 and a front side part 47 of the right side piece 43 is somewhat narrowed. Further, the second airbag 9 (one embodiment of the airbag 3) which can be elastically inflated and elastically deflated is accommodated in the accommodation part 45 as shown in FIG. 9A, and a base part 50 thereof is fixed to a bottom part 51 of the accommodation part 45. In the present embodiment, the second airbag 9 is adapted to be inflated so as to protrude toward an outer side of the second holding part 37 (a direction shown by an arrow in FIG. 9A) as seen in the vertical surface, as shown in FIG. 9B. The protruding amount is appropriately set according to a shape and a size of the drone so as to effectively prevent the danger that the drone 2 injures the person when the drone 2 collides with the other things such as the person, as mentioned later.

The second holding part 37 is structured, as shown in FIG. 2 in the present embodiment, such that an upper end 55 of an upper support member 53 provided upward on an upper surface 52 at a front side position of the arm-shaped support part 34 is coupled to an inner peripheral surface part 56 of the base plate part 39, and a lower end 60 of a lower support member 59 provided downward on a lower surface 57 at the front side position is coupled to the inner peripheral surface part 56 of the base plate part 39. In the present embodiment, axes of the upper support member 53 and the lower support member 59 are in conformity to the same vertical axis 61 (FIG. 3). The coupling can be achieved by using various known means such as various engaging means, for example, screw fixing and welding. As a result, the second holding part 37 is substantially provided in the central mounting part 11 via the second support part 62 which is constructed by the upper support member 53 and the lower support member 59.

Figure 10:
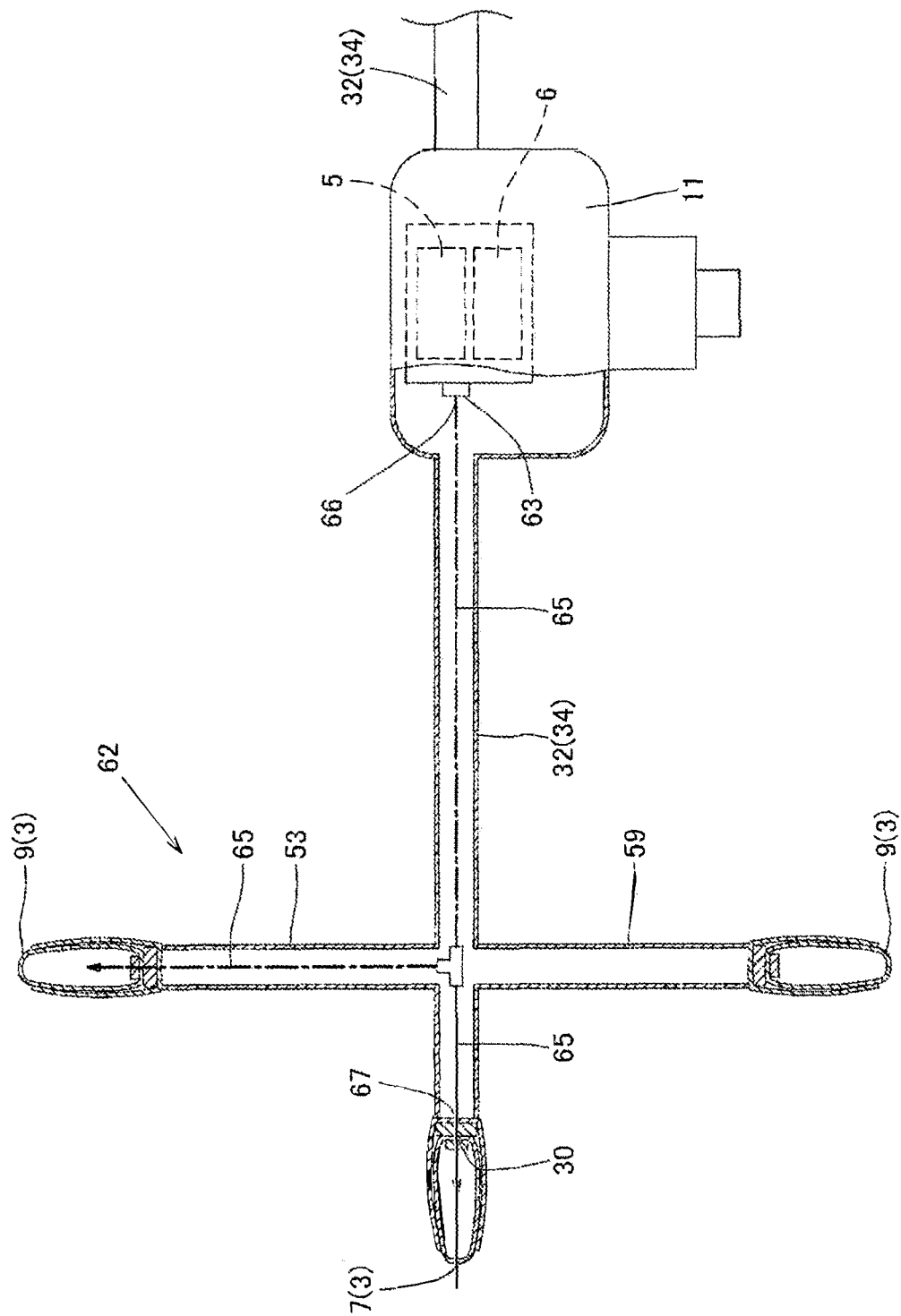
FIG. 10 is an explanatory view describing a gas supply structure and first and second inflation control portions for inflating or deflating the first airbag and the second airbag.

Further, as shown in FIG. 10, a supply suction port 63 selectively performing both gas supply and gas suction is provided in the pump which is accommodated in the central mounting part 11. The supply suction port 63 doubles as a gas supply port of the inflator in the present embodiment. Further, a piping 65 (illustrated by a single-dot chain line in FIG. 10 for the purpose of illustration) for supplying the gas is accommodated in each of the first support part 32 and the second support part 62, as shown in FIG. 10, one end 66 of the piping 65 is coupled to the supply suction port 63, and the other end 67 of the piping 65 is coupled to a hole part 69 arranged in the base part 30 of the first airbag 7 and a hole part 70 arranged in the base part 50 of the second airbag 9, as shown in FIGS. 8A and 10.

Figure 7:
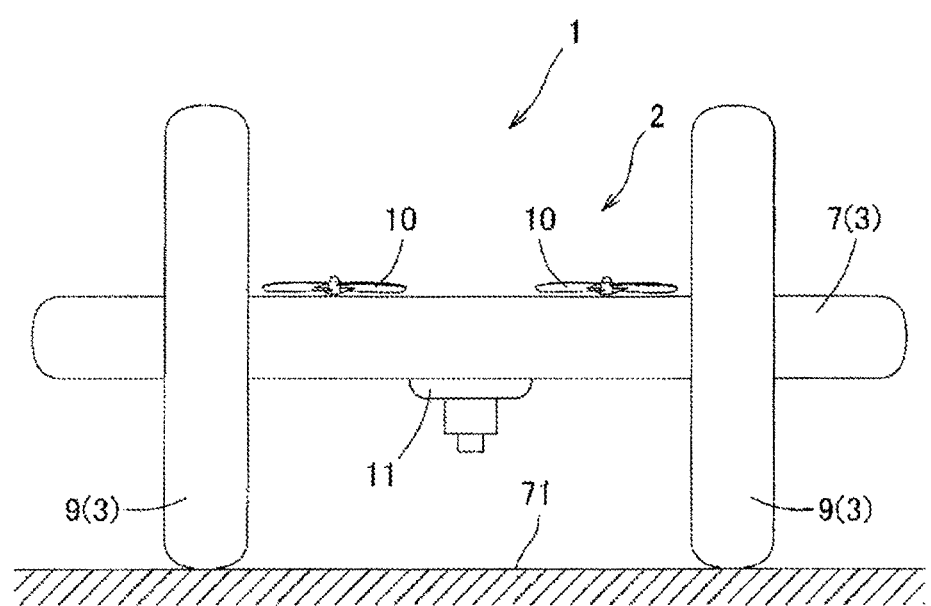
FIG. 7 is a front elevational view showing the drone with the airbag according to the present invention in a state in which the airbag is inflated.

The first inflation control portion 5 makes the first and second airbags 7 and 9 be simultaneously inflated as shown in FIGS. 1 to 2, 5 and 7, by supplying the gas to the first airbag 7 and the second airbag 9 via the piping 65 coupled to the supply suction port 63 of the pump prior to the drone 2 taking off the ground. In a state in which the first and second airbags 7 and 9 are inflated as mentioned above, the drone 2 can be put on the ground surface 71 by making the right and left second airbags 9 and 9 in the inflated state operate as leg parts as shown in FIG. 7. When the rotary vane 10 is rotated in this state, the drone 2 can take off the ground and fly away. As mentioned above, a state of the drone greatly changes when the drone 2 takes off the ground and flies away, and the drone tends to be unbalanced and has a high risk of being crashed due to the lack of the lift force and the influence of the air flow. However, in a case where the drone 2 taking off the ground is crashed before reaching a predetermined altitude, the first and second airbags 7 and 9 in the inflated state can effectively prevent the danger that the drone 2 injures the person even if the drone 2 collides with the other things such as the person.

When the first and second airbags 7 and 9 are in a desirably inflated state as mentioned above, it is not necessary to further supply the gas to the first and second airbags 7 and 9. Therefore, the second inflation control portion 6 is adapted to be not activated by a detection signal of a gas pressure detector (not shown) detecting a gas pressure of the first and second airbags 7 and 9.

Figure 6:
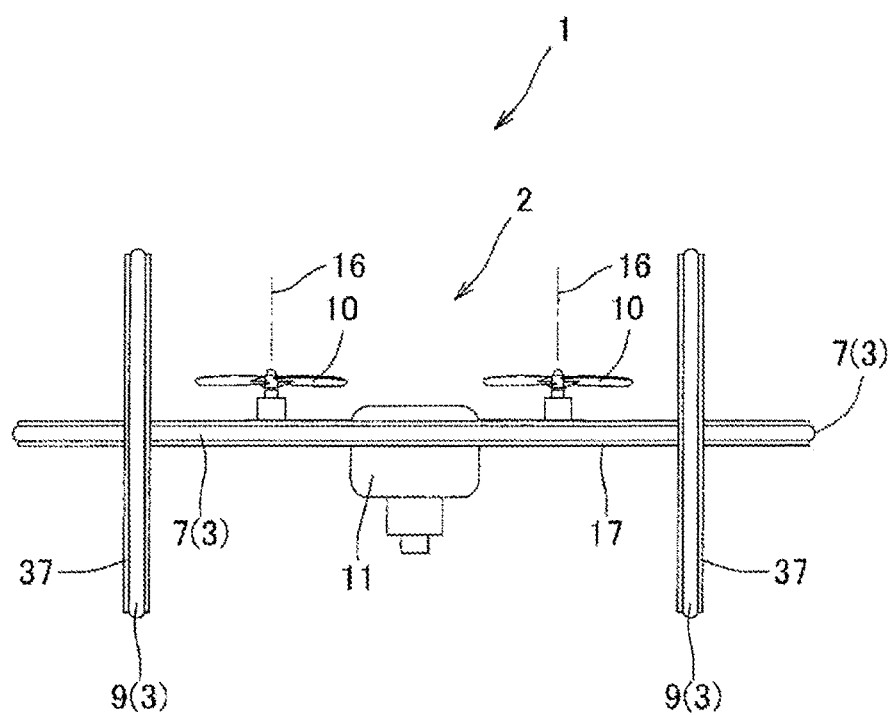
FIG. 6 is a front elevational view showing the drone with the airbag according to the present invention in a state in which the airbag is deflated.

Further, after the drone 2 rise safely and reaches a predetermined altitude, the gas in the first and second airbags 7 and 9 is sucked and discharged by the pump via the piping 65 on the basis of the control of the first inflation control portion 5, and the first and second airbags 7 and 9 simultaneously come to a deflated state as shown in FIGS. 3, 4 and 6. In the deflated state of the first and second airbags 7 and 9, the drone can fly in a low air resistance state, and can perform a photography work and a transfer work during the flight.

When the drone 2 comes to the uncontrollable state due to the trouble in the air frame and the influence of the abnormal weather and the radio disturbance and the risk of being crashed is generated in the drone 2 during the period when the drone 2 flies as mentioned above, the trigger device is activated on the basis of the control by the second inflation control portion 6, and the gas from the inflator is supplied to the first and second airbags 7 and 9 in the deflated state via the piping 65 coupled to the supply suction port 63. As a result, the first and second airbags 7 and 9 can be instantaneously inflated, and the inflation according to the control is performed before the drone 2 collides with the other things such as the person. Therefore, even if the crashed drone 2 collides with the other things such as the person, it is possible to effectively prevent the danger that the drone injures the person.

Further, when the drone 2 is ready for landing, the gas is supplied to the first airbag 7 and the second airbag 9 via the piping 65 coupled to the supply suction port 63 of the pump on the basis of the control of the first inflation control portion 5, whereby the first and second airbags 7 and 9 are simultaneously inflated. When inflating the first and second airbags 7 and 9 in this manner, the second inflation control portion 6 may be activated during the activation of the first inflation control portion 5. In this case, when the allowable pressures of the first and second airbags 7 and 9 are set, the pressure regulating means provided in the drone regulates pressure in such a manner that the gas pressure of the first and second airbags 7 and 9 does not go beyond the allowable values. After the drone 2 lands on the ground, the gas in the first and second airbags 7 and 9 is sucked and discharged by the pump via the piping 65 on the basis of the control of the first inflation control portion 5 as occasion demands, and the first and second airbags 7 and 9 simultaneously come to the deflated state as shown in FIGS. 3, 4 and 6.

As one of the pressure regulating means, there can be employed a means which stops the gas supply by the first inflation control portion 5 and continues the gas supply by the second inflation control portion 6. This is because it is necessary to instantaneously inflate the first and second airbags 7 and 9 while giving high priority to the gas supply by the second inflation control portion 6.

Further, as the other of the pressure regulating means, there can be employs a means which automatically discharges the gas by an automatic relief valve provided in the first and second airbags 7 and 9 when the gas pressure in the first and second airbags 7 and 9 goes beyond the allowable value while continuing the gas supply by the first and second inflation control portions 5 and 6. Even in this structure, the first and second airbags 7 and 9 can be instantaneously inflated on the basis of the gas supply mainly achieved by the second inflation control portion 6.

In a case where the second inflation control portion 6 is activated during the activation of the first inflation control portion 5 when inflating the first and second airbags 7 and 9, the pressure regulation is not required as long as the first and second airbags 7 and 9 can stand against the gas pressure which is simultaneously supplied by the activation of the first and second inflation control portion.

Figure 11:
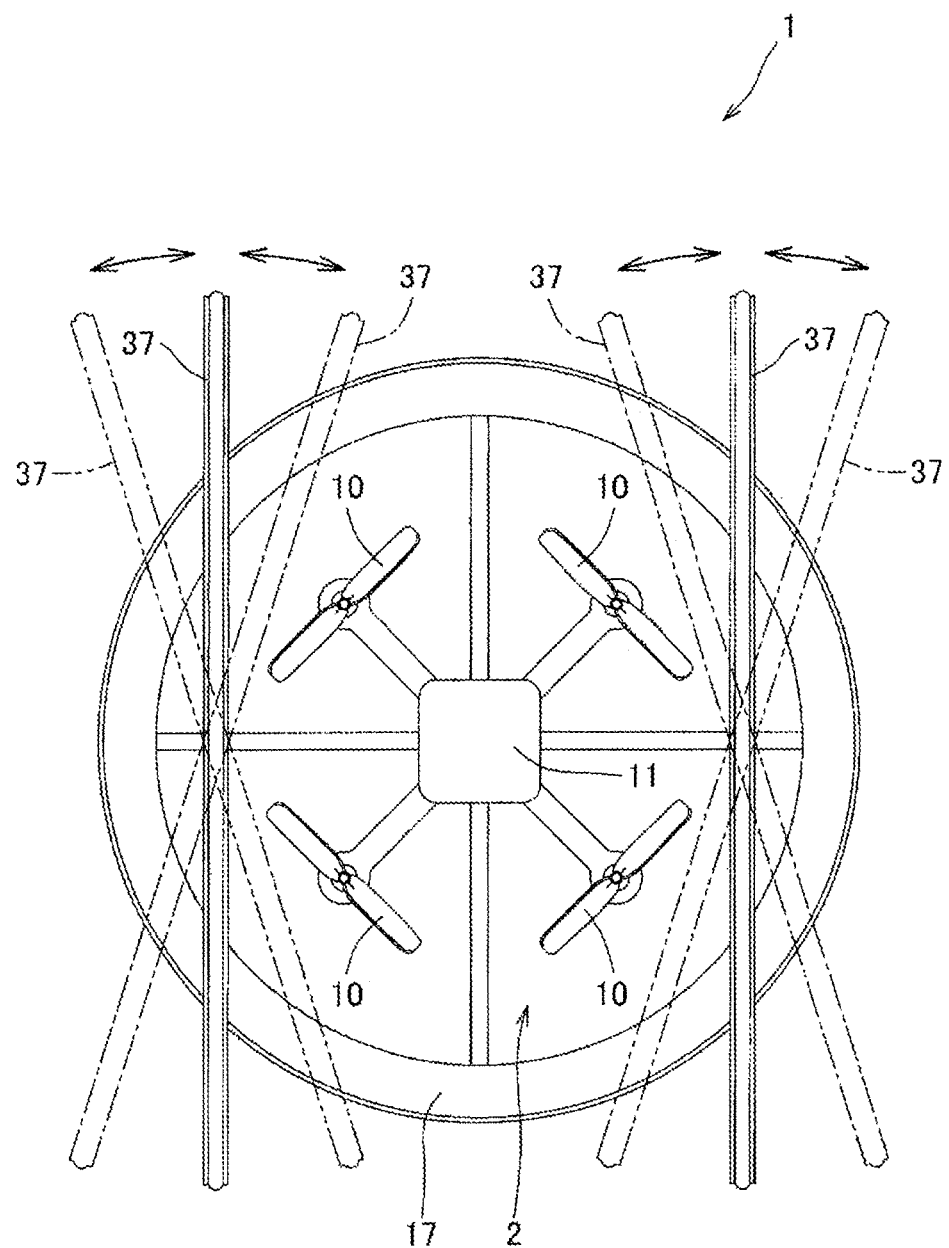
FIG. 11 is a plan view showing a drone with an airbag in which a second holding part is structured such as to be rotatable in a horizontal surface in a clockwise direction or a counterclockwise direction, in a state in which the airbag is deflated.

In FIGS. 1 and 3 to 4, the second holding parts 37 and 37 located on the right and left are formed long in the horizontal direction and are fixedly provided in the drone 2 via the second support part 62. However, the second holding parts 37 and 37 may be structured such as to be rotatable in a clockwise direction or a counterclockwise direction around the vertical axis 61 (FIG. 3) which is common between the upper support member 53 and the lower support member 59, for example, as shown in FIG. 11. In this structure, it is possible to obtain a state in which a field of view is not obstructed by the second holding parts 37 and 37, for example, in a state of photographing with a camera, by setting the second holding parts 37 and 37, for example, to a V-shaped form in a plan view as shown by a two-dot chain line in FIG. 11, or to an inverted-V-shaped form in a plan view as shown by a one-dot chain line in the same drawing.

Figure 12:
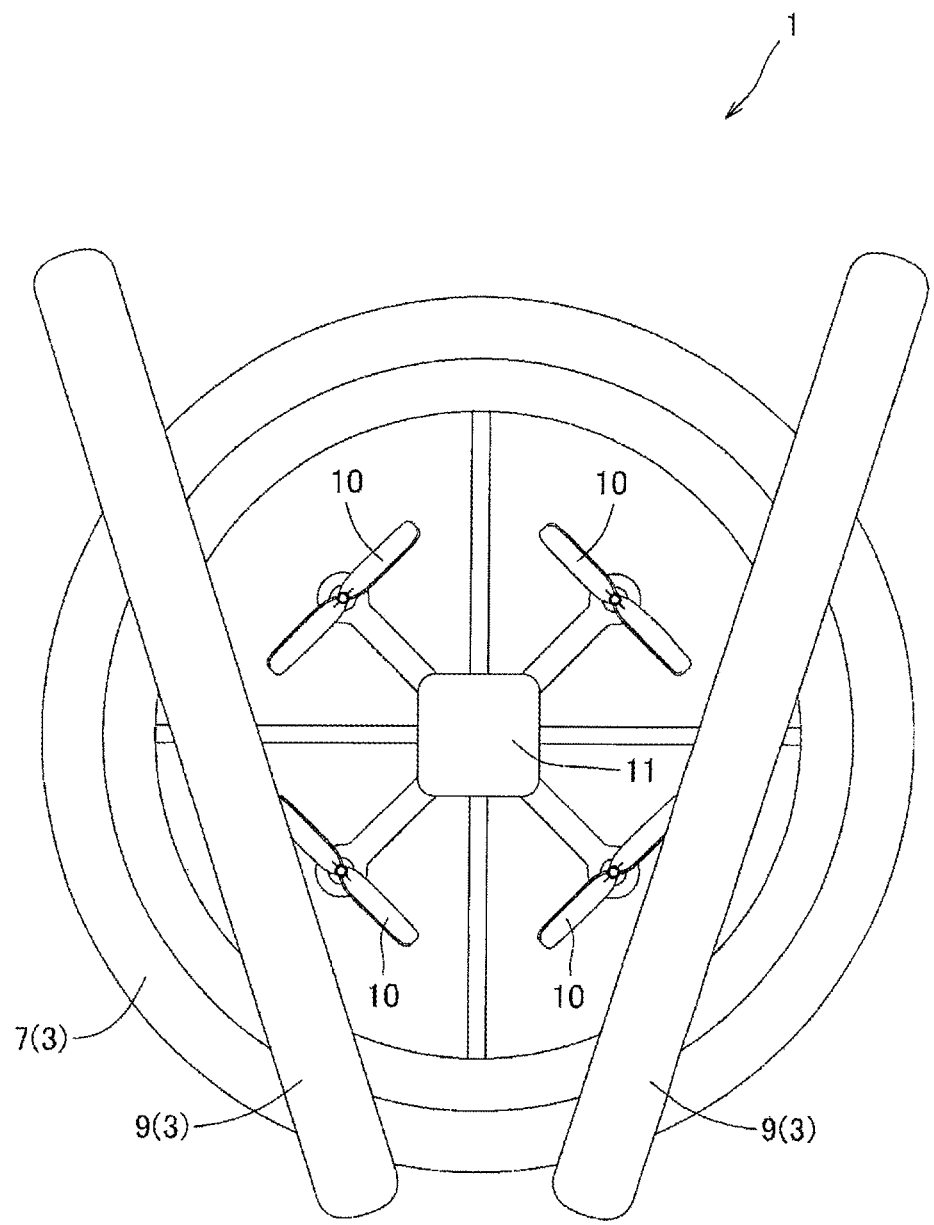
FIG. 12 is a plan view showing a state in which the airbag is inflated, in the drone with the airbag.
Figure 13:
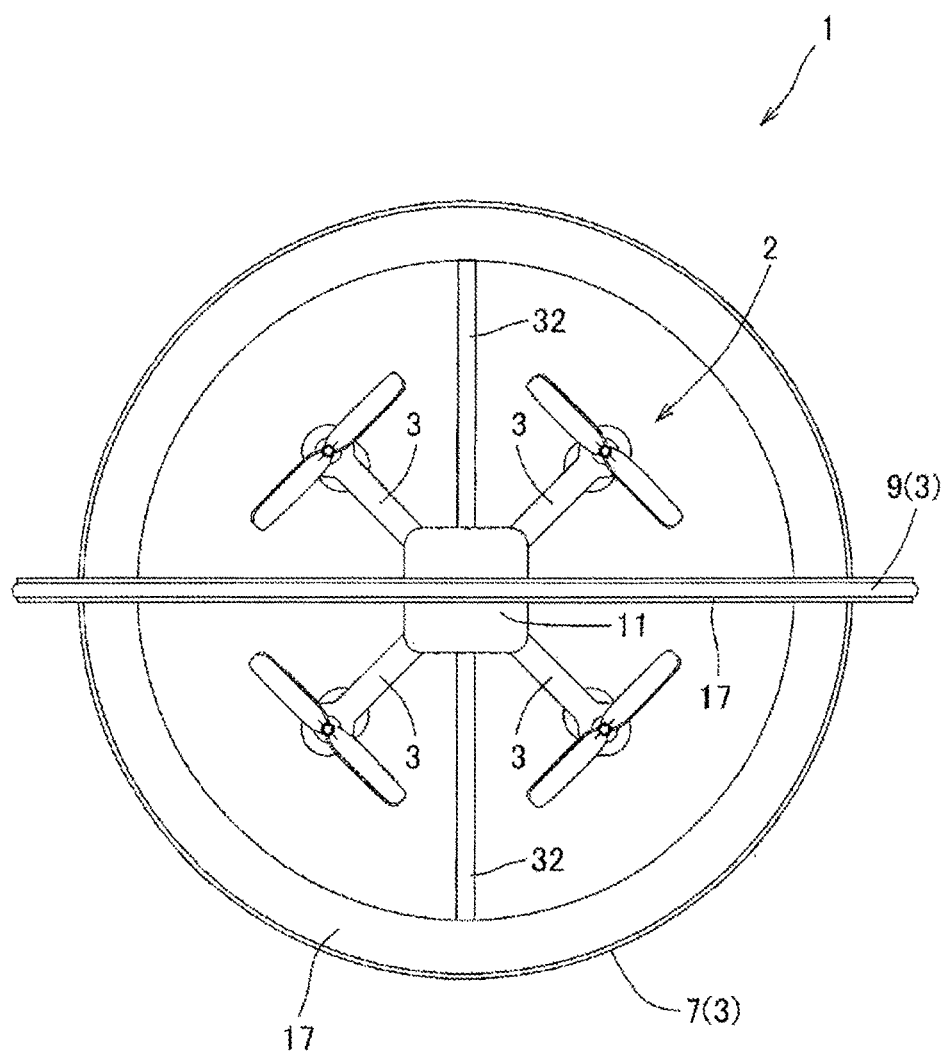
FIG. 13 is a plan view showing a drone with an airbag in which only one second airbag is arranged at the center portion, in a state in which the airbag is deflated.

FIG. 12 shows a state in which the second holding parts 37 and 37 are in the state of the V-shaped form in the plan view and the second airbags 9 and 9 are inflated.

Embodiment 2

Figure 14:
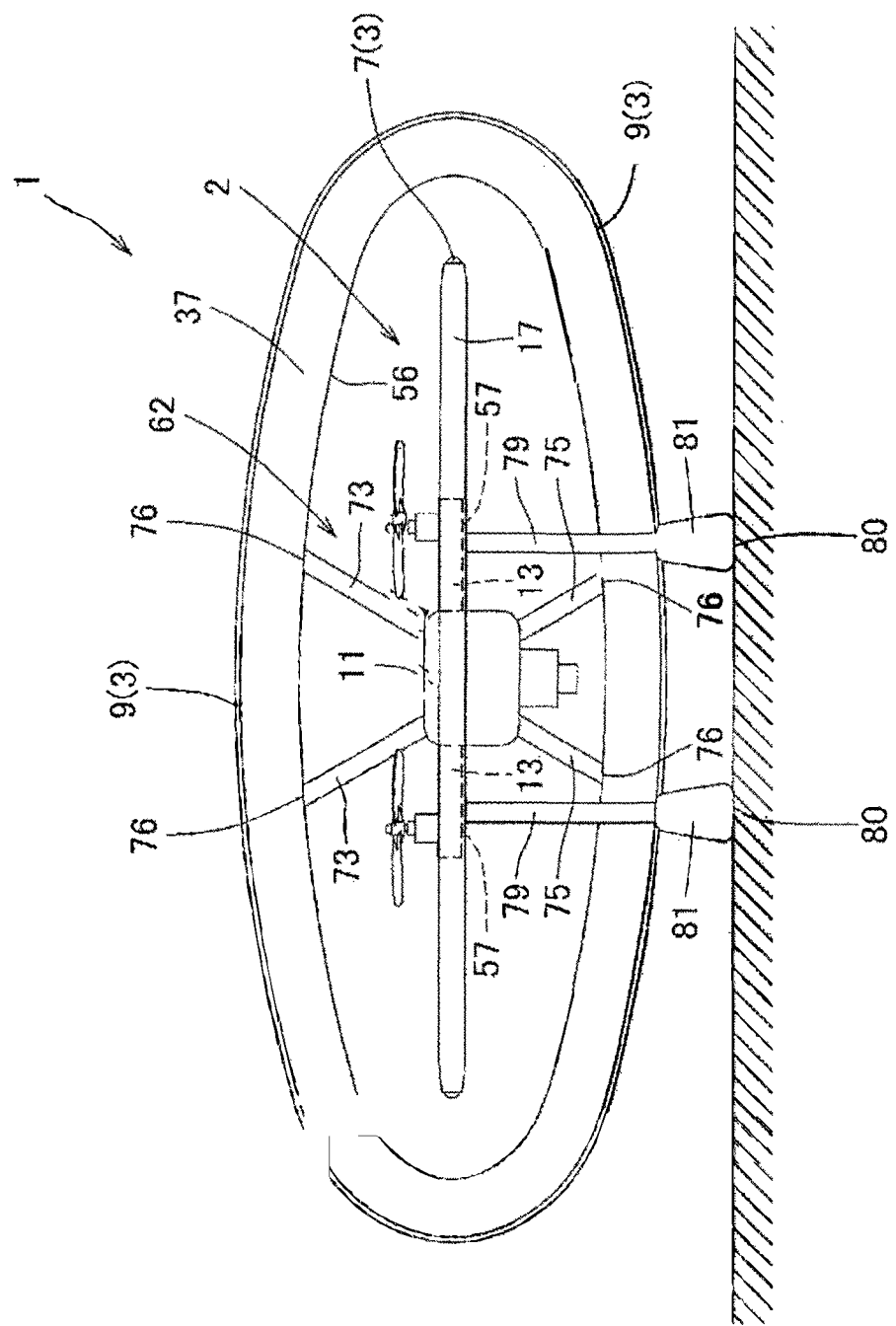
FIG. 14 is a front elevational view showing the drone with the airbag.

FIGS. 13 to 16 shows the other embodiment of the drone with the airbag 1 which performs the method of controlling the drone with the airbag according to the present invention, and shows a structure in which only one second airbag 9 surrounding the drone 2 in the vertical surface is provided, and the second airbag 9 is provided in a state of surrounding the first airbag 7 in the vertical surface while putting the central mounting part 11 at the center, which is different from the structure in the embodiment 1. The second airbag 9 is held by the second holding part 37 having the same structure as mentioned above, as shown in FIG. 14. However, the second support part 62 supporting the second holding part 37 to the central mounting part 11 is constructed by inversely protruding upper angular support members 73 and 73 and inversely protruding lower angular support members 75 and 75 which are respectively provided in a protruding manner in upper and lower sections of the central mounting part 11 in the present embodiment, as shown in FIG. 14. Further, each of front ends 76 of the upper and lower angular support members 73 and 75 is coupled to an inner peripheral part 56 of the base plate part 39 in the second holding part 37.

Figure 15:
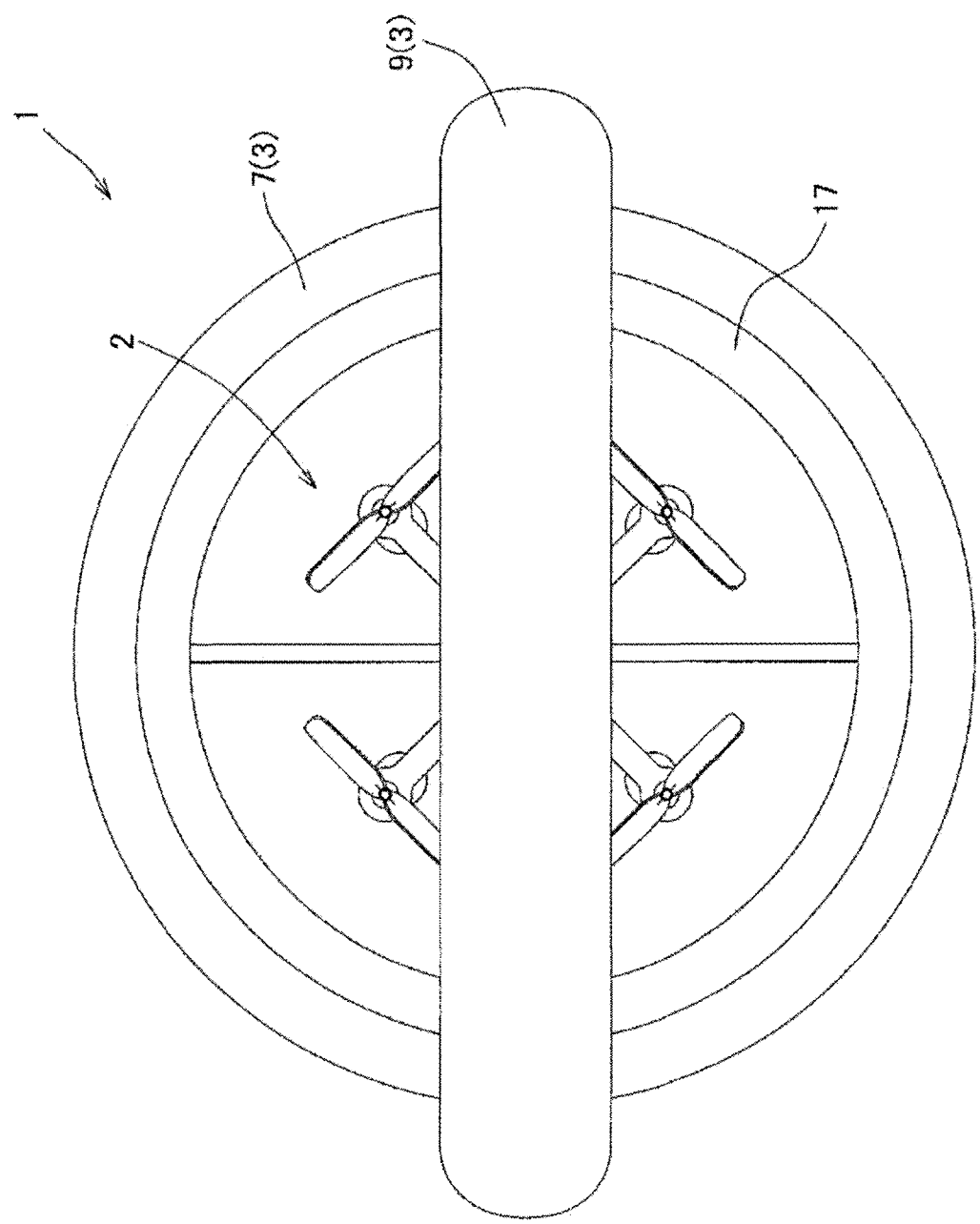
FIG. 15 is a plan view showing the drone with the airbag in a state in which the airbag is inflated.

Since only one second airbag 9 is provided in the present embodiment, a width of the second airbag 9 in an inflated state is preferably set to be wider, for example, as shown in FIG. 15. Further, in the present embodiment, since the second airbag 9 is only provided so as to surround in the vertical surface while putting the central mounting part 11 at the center as is different from the embodiment 1, the drone 2 can not be set on the ground surface 71 only by the second airbag 9 in the inflated state or may be unstably set.

Figure 16:
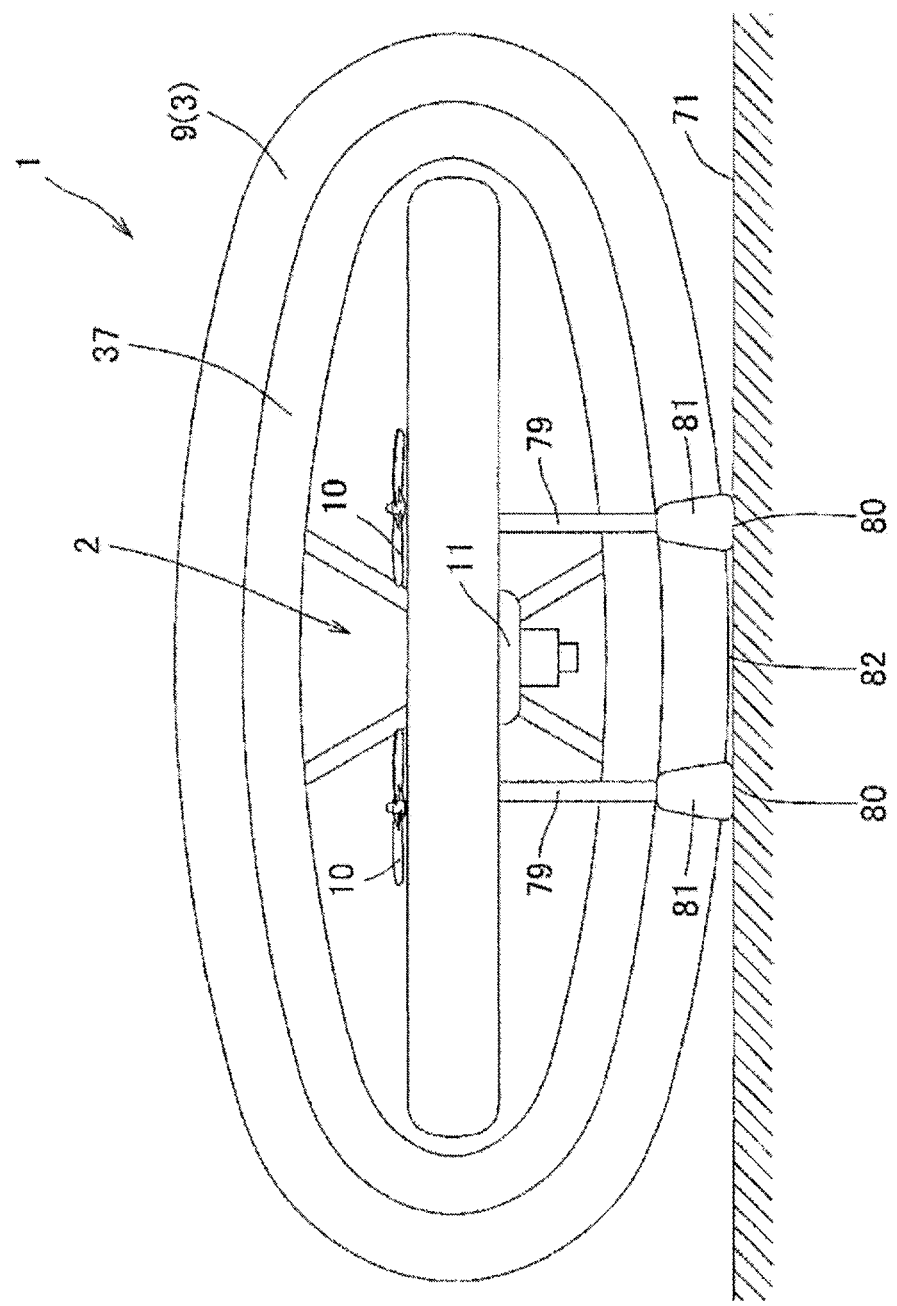
FIG. 16 is a front elevational view showing the drone with the airbag in a state in which the airbag is inflated.
Figure 17:
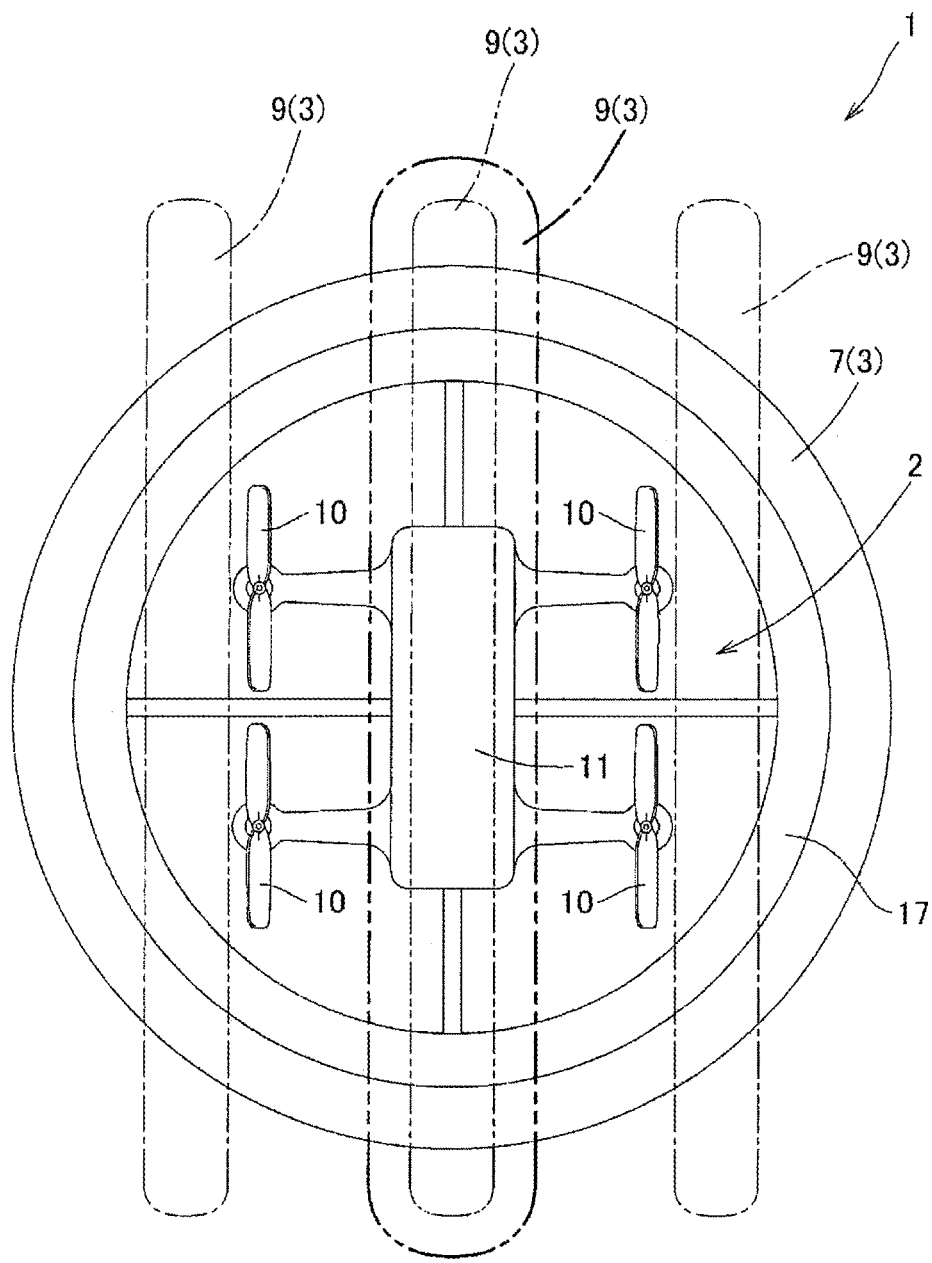
FIG. 17 is a plan view showing a drone with an airbag in which second airbags surrounding the drone in a vertical plane are arranged in three columns at intervals in a horizontal direction.
Figure 18:
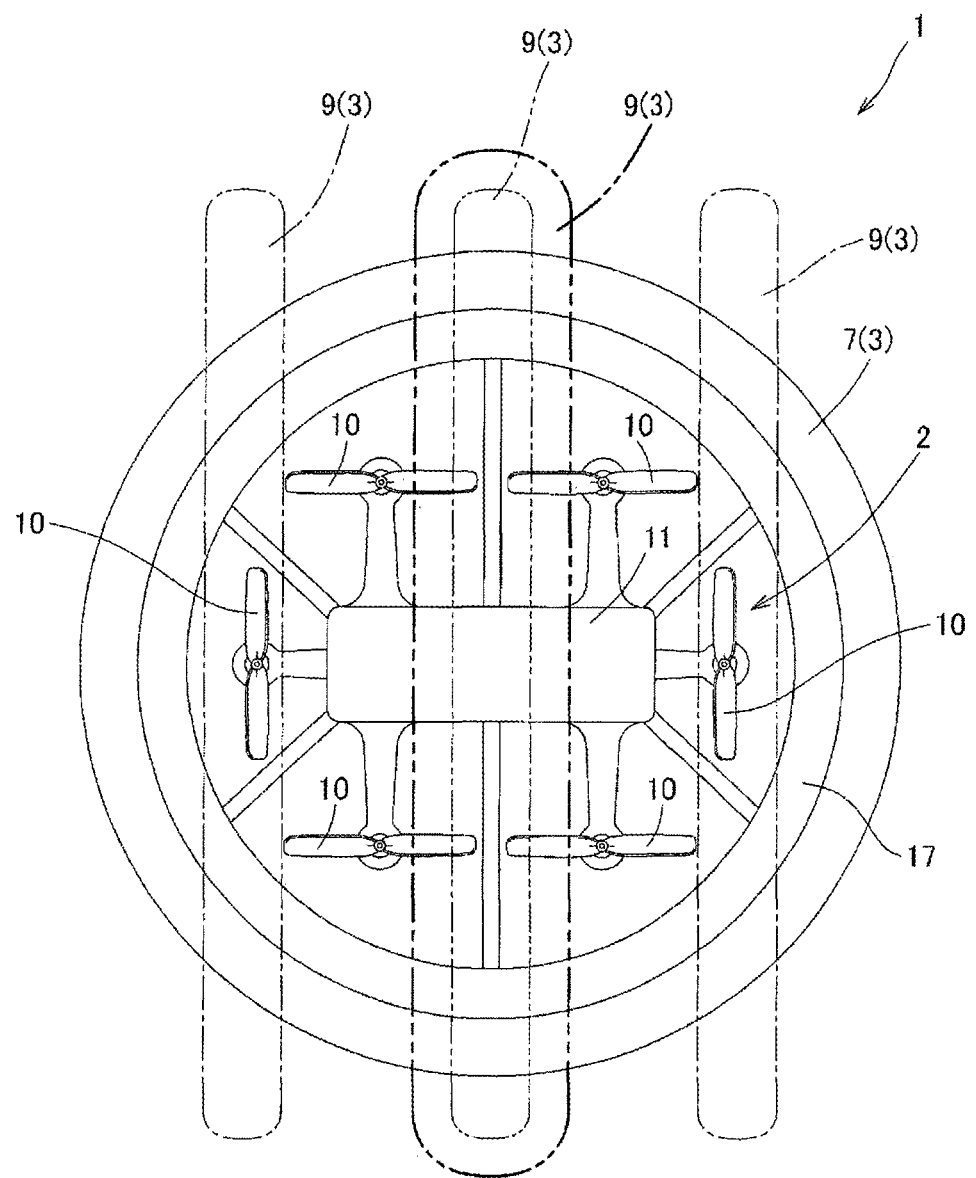
FIG. 18 is a plan view showing the other aspect of the drone with the airbag in which the second airbags are arranged in three columns at intervals in the horizontal direction.

For that reason, for example, as shown in FIG. 14, a leg part 79 is protruded downward in a lower surface portion 57 of each of the arm parts 13, 13, 13 and 13, and the drone can be set by a lower end 80 of each of four leg parts 79, 79, 79 and 79 when the drone 2 takes off and lands on the ground, as shown in FIG. 16.

In the present embodiment, a lower end part 81 of the leg part 79 is constructed by a soft foamable resin, and the lower end 80 is structured such as to somewhat protrude to a lower side of a lower end part 82 of the second airbag 9 in the inflated state, in a state in which the second airbag 9 is inflated as shown in FIG. 16.

Accordingly, although the drone 2 is provided with the leg part 79, it is possible to prevent the drone 2 from injuring the person as much as possible even if the lower end 80 hits against the person when the drone 2 is crashed.

Embodiment 3

The present invention is not limited to the structures shown by the embodiments mentioned above, but can be design changed variously within the scope of claims.

(1) The the second airbag 9 can be variously structured according to an intended use such as monitoring, transferring and spraying. For example, it is possible to freely set a shape of the central mounting part 11 and an arranged state and the number of the rotary vane 10.

FIGS. 17 to 23 are plan views showing the other embodiments of the drone 2. In particular, a protective frame 83 formed into a circular shape such as an annular shape and surrounding the rotary vane 10 is provided in FIG. 19. Further, in FIG. 20, a protective frame 84 formed into a circular arc shape and surrounding the rotary vane 10 in an outer side thereof is provided.

Figure 19:
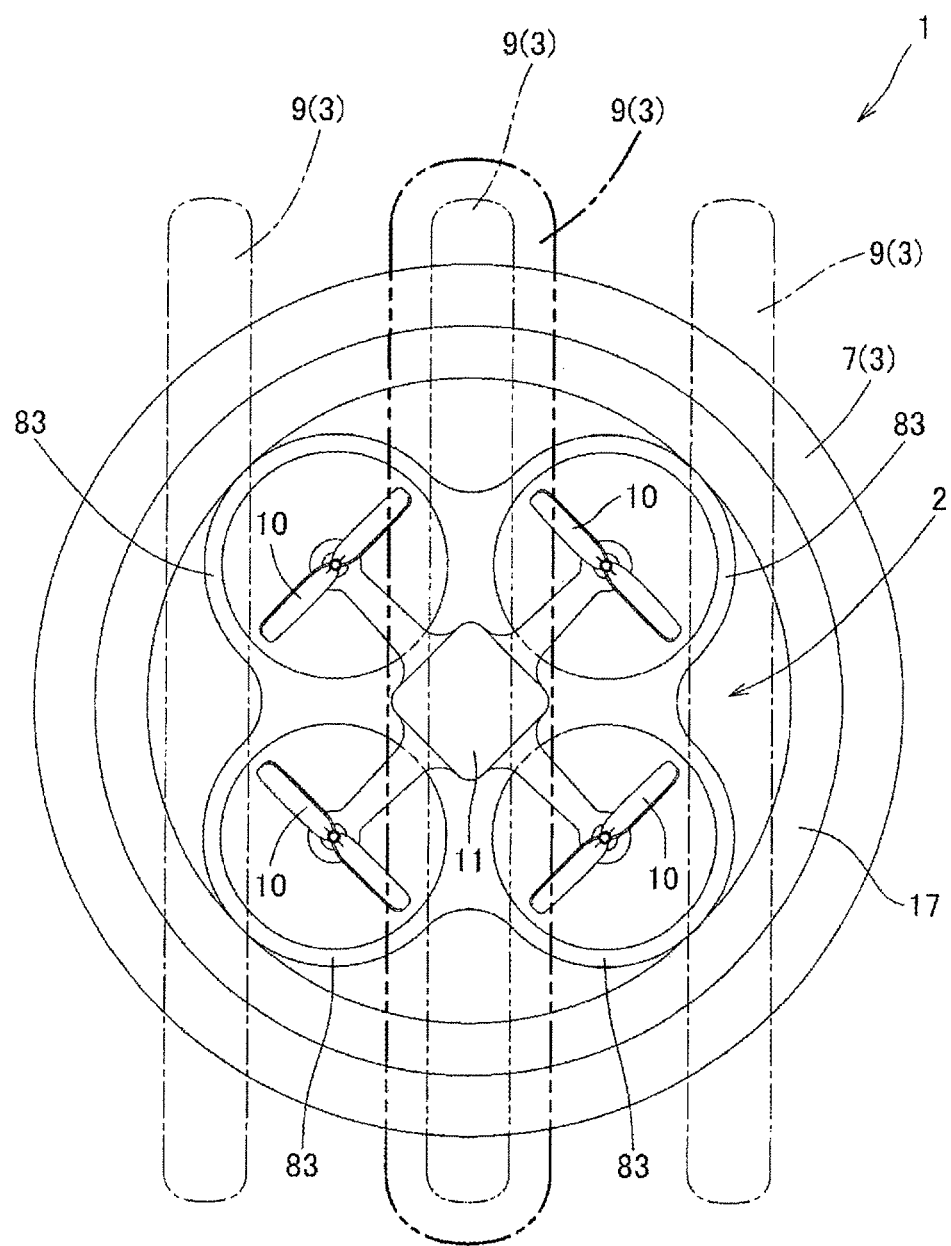
FIG. 19 is a plan view showing further the other aspect of the drone with the airbag in which the second airbags are arranged in three columns at intervals in the horizontal direction.
Figure 20:
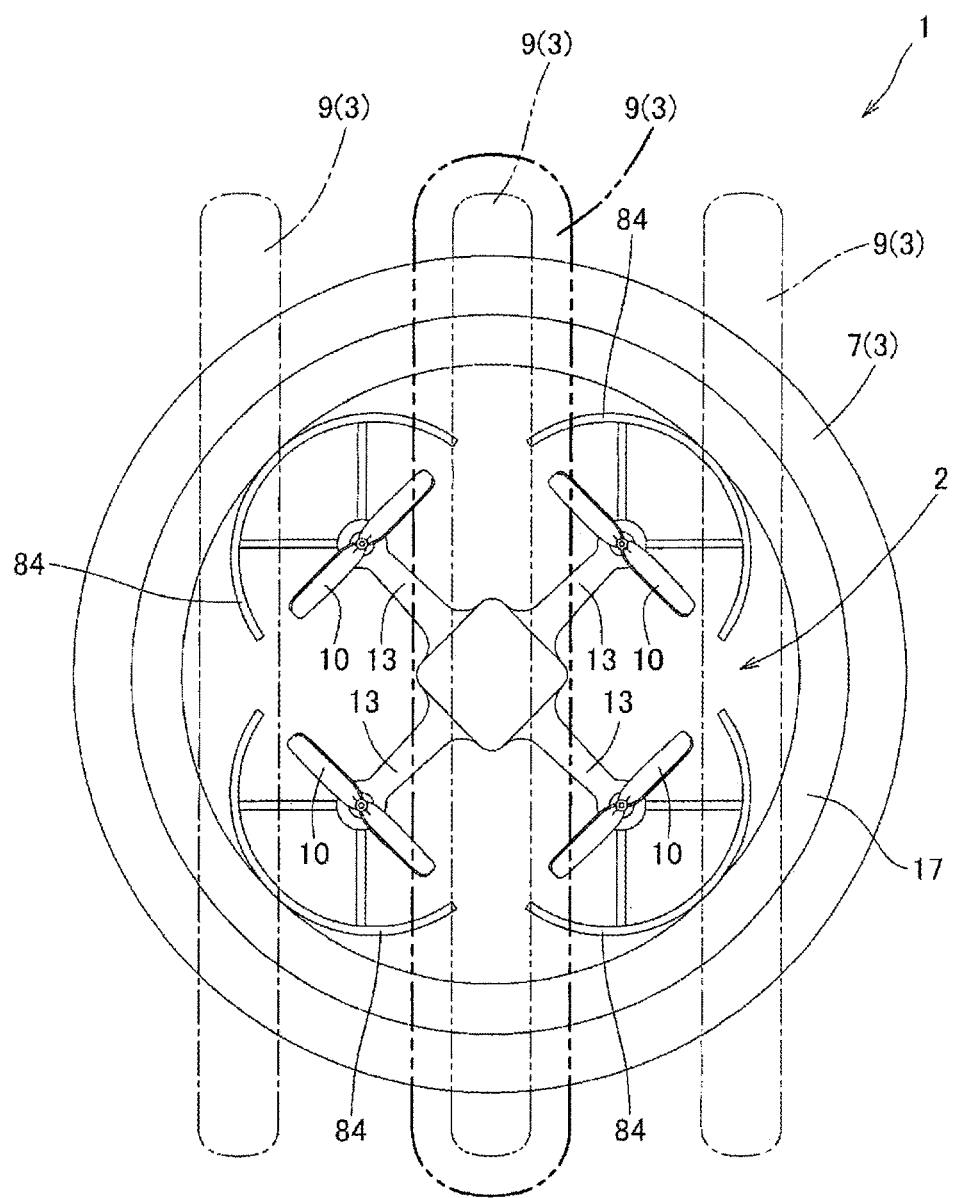
FIG. 20 is a plan view showing further the other aspect of the drone with the airbag in which the second airbags are arranged in three columns at intervals in the horizontal direction.

In a case where the protective frame 83 and the protective frame 84 are provided as mentioned above, the protective frames 83 and 84 may be used for constructing the first support part 32. In FIG. 19, the protective frame 83 is provided in the central mounting part 11. Further, in FIG. 20, the protective frame 84 is provided in the arm part 13.

(2) A shape and a magnitude of the airbag 3, an attached and arranged state to the drone 9 and an attaching means for the drone 9 can allow the drone 9 to take off and land on the ground even in a state in which the airbag 3 is inflated, and are desirably structured such as to effectively prevent the danger that the drone 9 injures the person in a case where the drone 9 is crashed and collides with the other things such as the person and the building.

Figure 23:
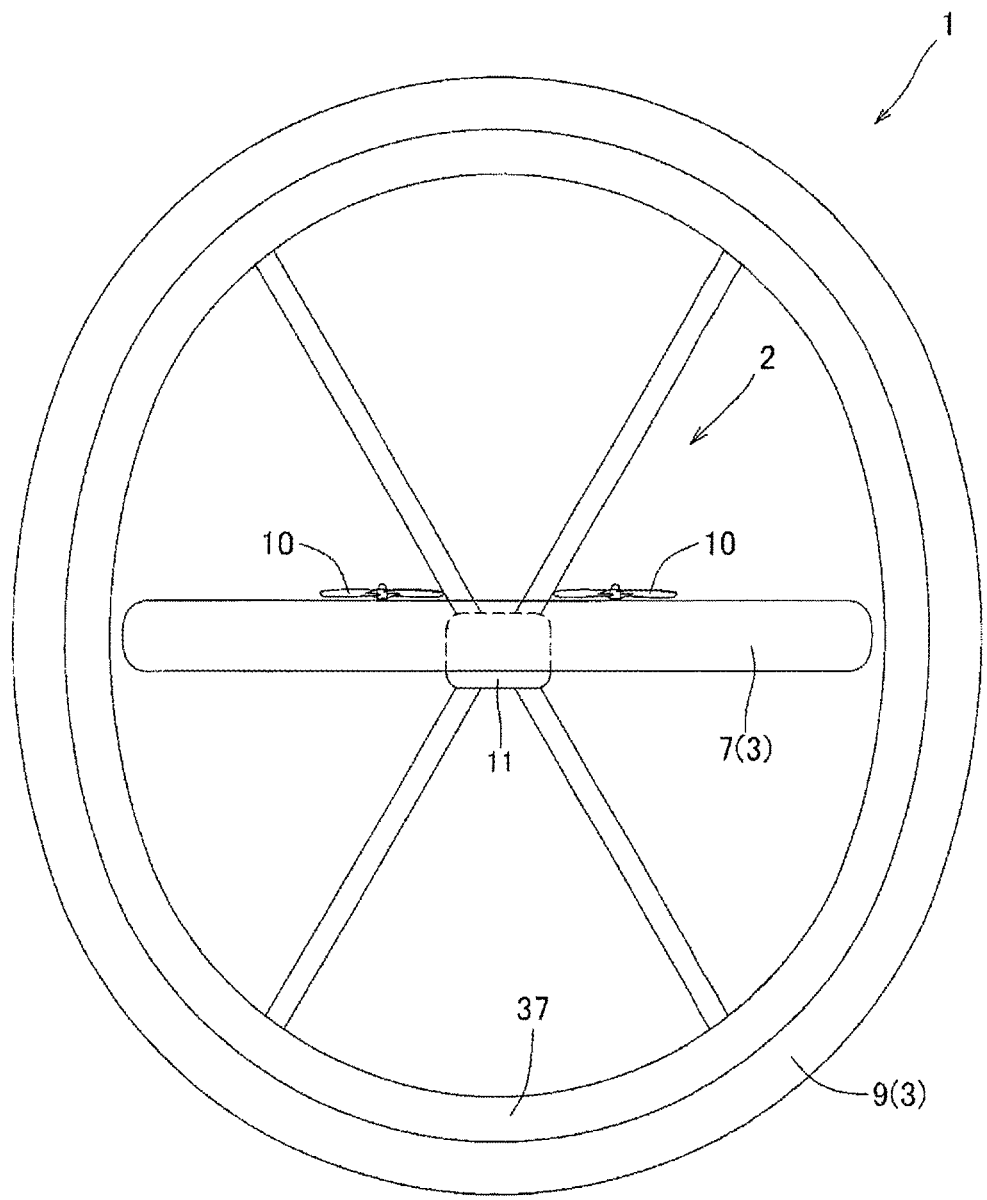
FIG. 23 is a side elevational view showing the other aspect of the drone with the airbag in which the second airbag is formed into an oval ring shape.

FIG. 23 shows a case that the second holding parts 37 and 37 provided right and left are formed into an oval ring shape which is somewhat long vertically, and the second airbags 9 and 9 held by the second holding part 37 are in the inflated state.

The first airbag 7 is provided so as to surround the drone 2 in the horizontal surface and is in the inflated state, and a shape of the first airbag 7 in a plan view is variously set according to the shape of the drone 2 in addition to the circular ring shape mentioned above. For example, in a case where the number of the arm part 13 is set to three in an angular pitch, the shape of the first airbag 7 in the inflated state in the plan view may be set to a triangular ring shape. Further, in a case where the number of the rotary vane 10 is intended to be increased for generating a greater lift force, the number of the arm part 13 protruded outward from the central mounting part 11 is increased. In a case where the number is, for example, five, six or eight, the shape of the first airbag 7 in the inflated state in the plan view may be set to a pentagonal ring shape, a hexagonal ring shape, an octagonal ring shape, and an oval ring shape in addition to the circular ring shape. Further, the shape may be set to a shape such as a quadrangular ring shape in a case where the number of the arm part 13 is four as mentioned above. In a case where the shape of the first airbag 7 in the inflated state in the plan view is set to the other shape than the circular ring shape, the shape of the first holding part 17 is set so, and the inflated state of each of the parts of the first airbag 7 is different, so that such a ring shape may be set. Same applies to the second airbag 9.

In the drone with the airbag 1 shown in FIGS. 17 to 22, there are provided the first airbag 7 which surrounds the drone 2 in the horizontal surface and has the same structure as that in the embodiment 1, and the second airbag 9 which surrounds the drone 2 in the vertical surface and has the same structure as that in the embodiment 1. The second airbag 9 is shown by distinguishing with a one-dot chain line and a two-dot chain line. The second airbags 9 shown by the one-dot chain line are provided in a state in which the second airbags 9 surround the first airbag 7 in the right and left sides of the central mounting part 11 within the vertical surface, respectively in right and left sides of the drone 2. Further, the second airbag 9 shown by the two-dot chain line is provided in a state in which the second airbag 9 surrounds the first airbag 9 within the vertical surface while putting the central mounting part 11 of the drone 2 at the center. In these drones 2, all of these second airbags 9, 9 and 9 may be provided, only the second airbags 9 and 9 in both sides shown by the one-dot chain line may be provided, or only the center airbag 9 shown by the two-dot chain line may be provided. In a case where only the center airbag 9 is provided as the second airbag 9, the center airbag 9 is preferably constructed wider as shown by a thick two-dot chain line in FIGS. 17 to 22.

Figure 21:
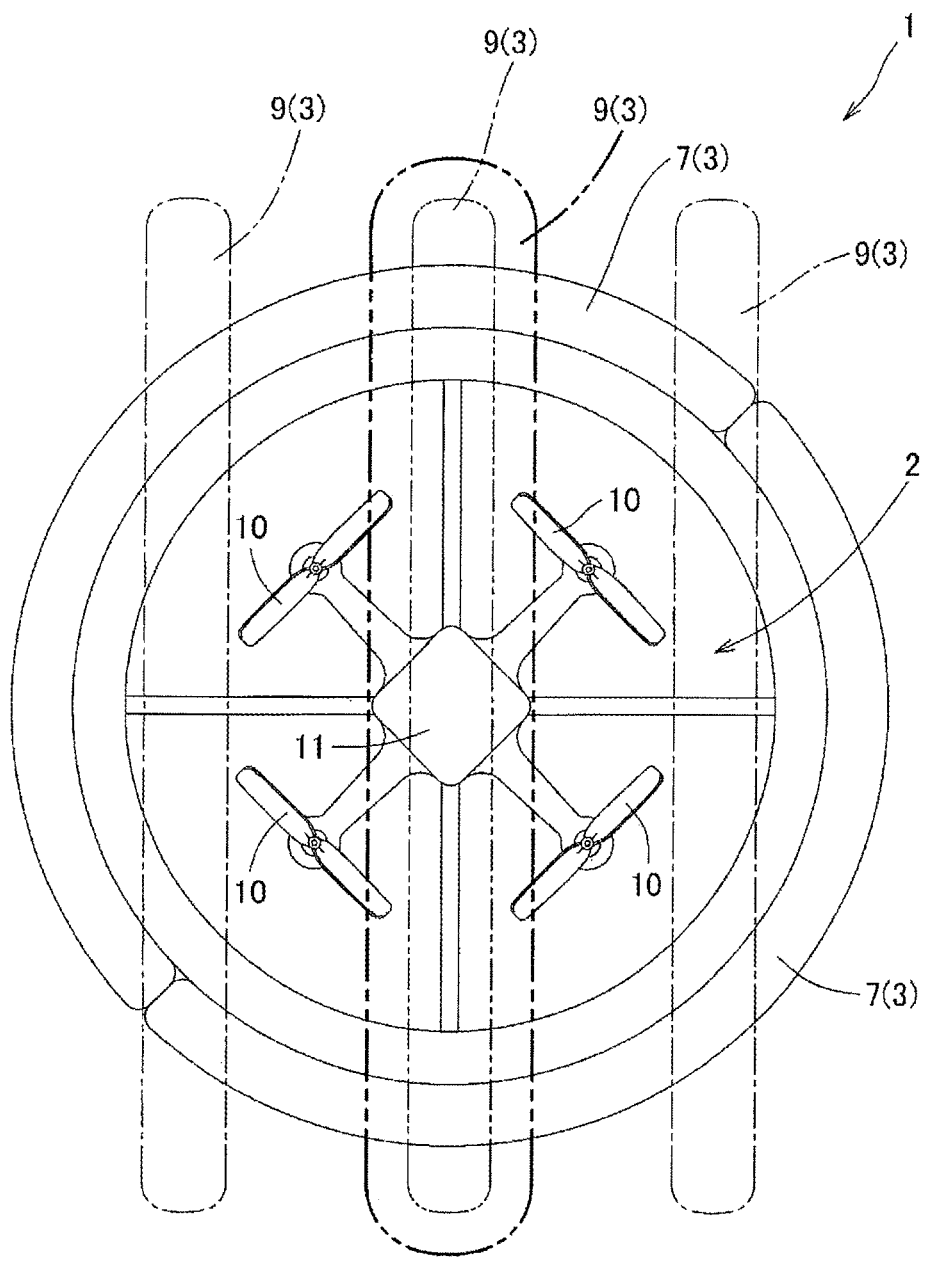
FIG. 21 is a plan view showing further the other aspect of the drone with the airbag in which the second airbags are arranged in three columns at intervals in the horizontal direction.
Figure 22:
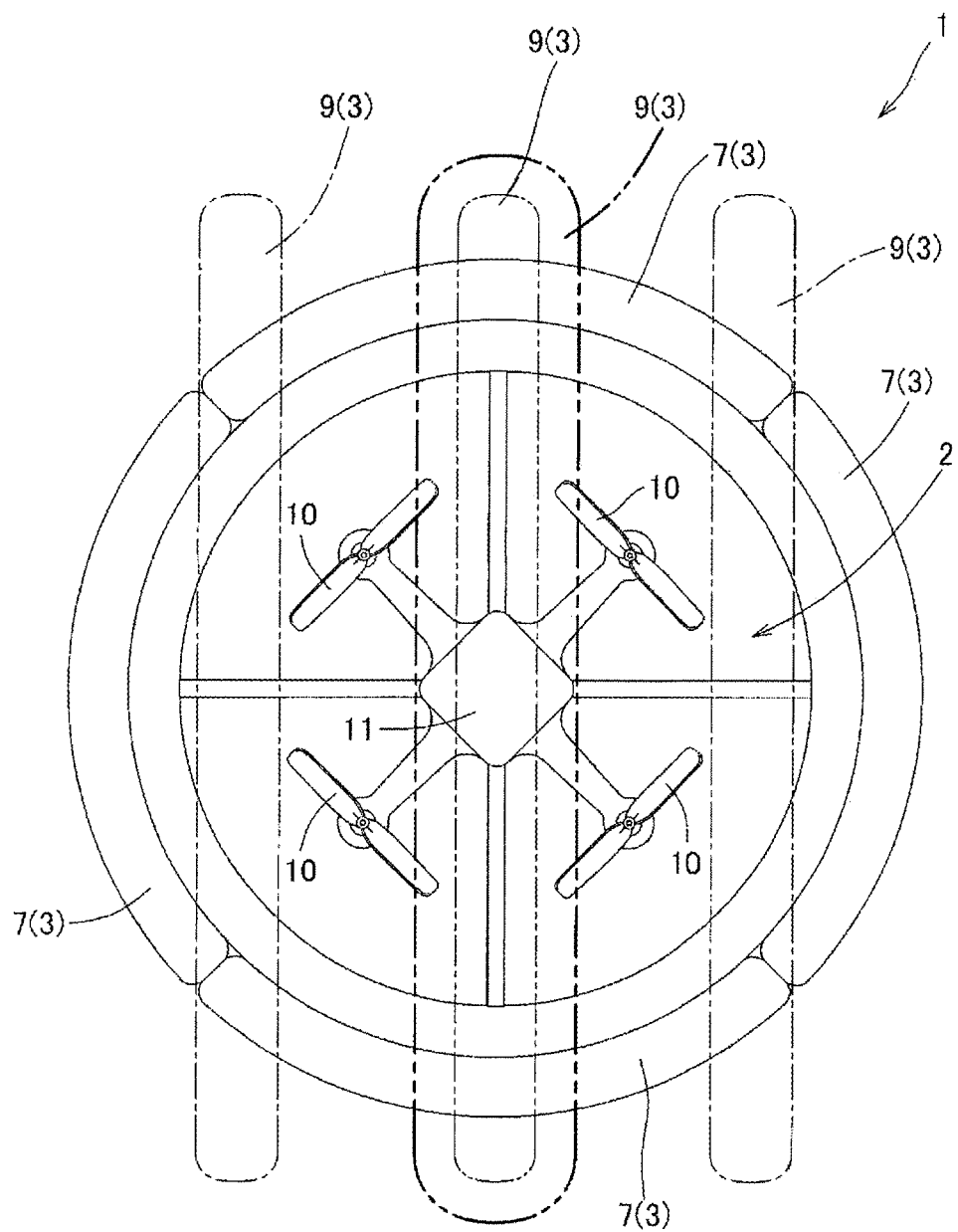
FIG. 22 is a plan view showing further the other aspect of the drone with the airbag in which the second airbags are arranged in three columns at intervals in the horizontal direction.

(3) As long as the first airbag 7 can effectively prevent the danger when the crashed drone collides with the other things such as the person, the first airbag 7 is not essentially provided continuously in the horizontal plane, but may be provided intermittently with spaces, for example, as shown in FIGS. 21 to 22. Alternatively, the first airbag 7 may be continuously constructed via connection parts which are not inflated, in spite of the continuous state of the first airbag 11 in the horizontal plane. For example, the first airbag 7 may be constructed as a two-divided continuous state as shown in FIG. 21 or a four-divided continuous state as shown in FIG. 22. Same applies to the second airbag 9.

(4) The distance between the upper and lower ends 85 (FIG. 2) of the inflated second airbag 9 as seen in the vertical plane and the center 86 (FIG. 2) of the central mounting part 11 may be set to the same level in the upper and lower sides as shown in FIG. 2, with regard to the upper part 87 and the lower part 89 of the second airbag 9. Alternatively, the distance for the lower part 89 may be set to be larger than the distance for the upper part 87, or the distance for the upper part 87 may be inversely set to be larger than the distance for the lower part 89. Whether the distance for the lower part 89 is set to be larger or the distance for the upper part 87 is set to be larger is set in such a manner as to make the danger that the crashed drone 2 injures the person when the crashed drone 2 collides with the other things such as the person smaller, while taking into consideration the shape and the structure of the drone 2.

For example, in a case where the degree of protrusion in the lower surface part of the central mounting part 11 is great, the distance for the lower part 89 can be set to be larger. On the contrary, in a case where the degree of protrusion in the upper surface part of the central mounting part 11 is great, the distance for the upper part 87 can be set to be larger.

The protruding state of the second airbag 9 as mentioned above can be set by deviating the center of the second holding part 37 to the lower side in relation to the center 86 of the central mounting part 11 or deviating the center of the second holding part 37 to the upper side, in a case where the second holding part 37 is formed into the oval ring shape, for example, as shown in FIG. 3. Alternatively, in the case shown in FIG. 3, it can be achieved by structuring such that the second airbag 9 attached in the folded state to the lower part of the second holding part 37 can be inflated in such a manner as to protrude outward more than the second airbag 9 attached to the upper part of the second holding part 37.

Figure 24:
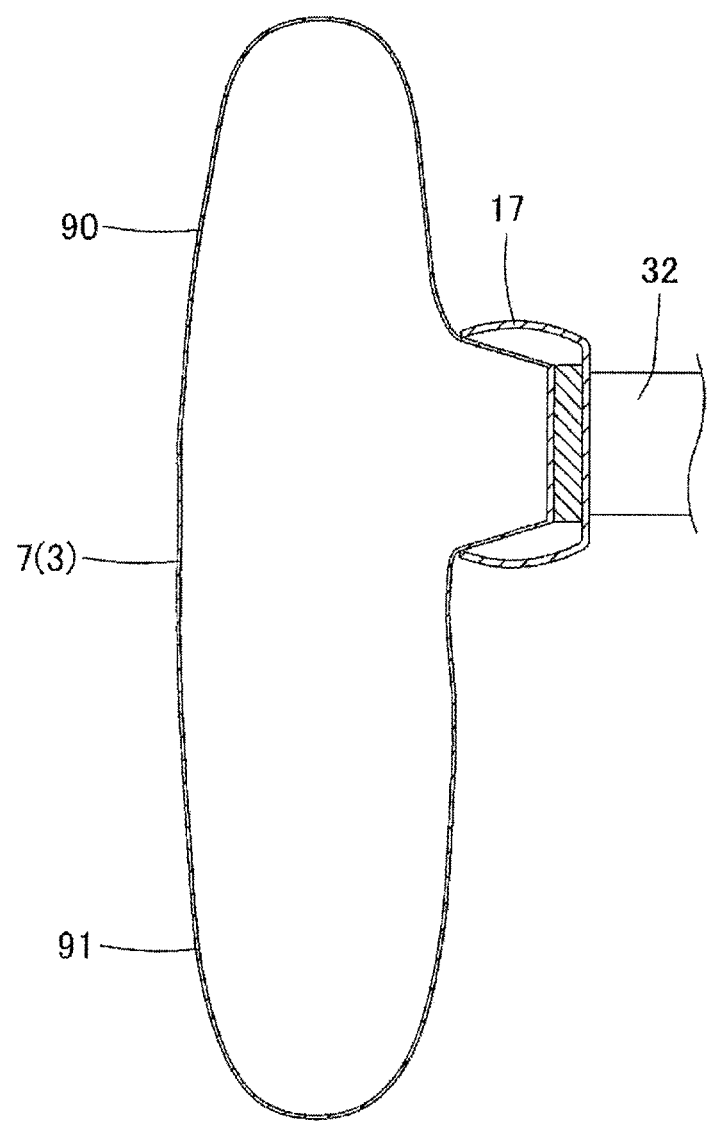
FIG. 24 is a cross sectional view showing a state in which a first airbag held by a first holding part is inflated so as to protrude outward as seen in a horizontal surface and is simultaneously inflated so as to protrude long in a vertical direction.

(5) The first airbag 7 may be structured, for example, as shown in FIG. 24, such as to be inflated so as to protrude long upward and/or downward as well as being inflated so as to protrude outward as seen in the horizontal plane by the supplied gas. In FIG. 24, there is shown a state of being inflated so as to protrude long upward and downward. In the case of being inflated so as to protrude long upward and downward as mentioned above, the upper and lower protruding portions 90 and 91 can more effectively achieve the buffer action in a vertical direction, and it is possible to more effectively achieve the prevention of the danger in a case where the drone 2 collides with the person, by means of the upper and lower protruding portions 90 and 91. In particular, at least in the case of being inflated so as to protrude long downward, the drone 2 tends to be crashed in a state in which the lower surface part thereof is directed downward in the normal case. As a result, it is possible to more effectively achieve the prevention of the danger and this structure is accordingly preferable.

Figure 25:
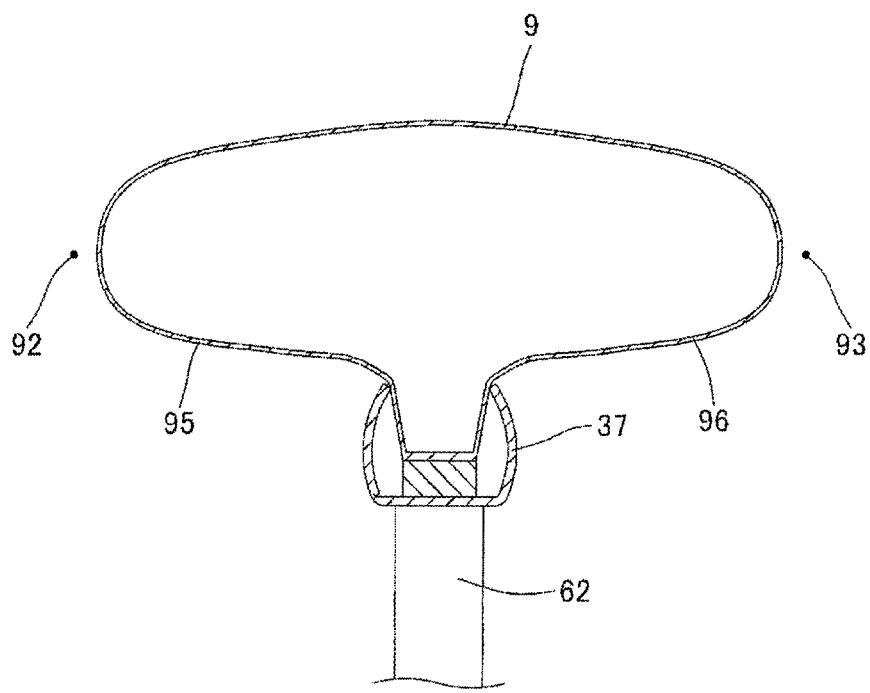
FIG. 25 is a cross sectional view showing a state in which a second airbag held by a second holding part is inflated so as to protrude outward as seen in a vertical surface and is simultaneously inflated so as to protrude long toward one side and the other side as seen in a surface orthogonal to the vertical surface.

(6) The second airbag 9 may be structured, for example, as shown in FIG. 25, such as to be inflated so as to protrude long to one side and/or the other side as seen in a surface which is orthogonal to the vertical plane, as well as being inflated so as to protrude outward as seen in the vertical plane, by the supplied gas. In FIG. 25, there is shown a state of being inflated so as to protrude long toward the one side 92 and the other side 93. Since an expanding area of the second airbag 9 in the orthogonal surface is increased by reverse protruding parts 95 and 96, it is possible to effectively prevent the danger that the drone 2 injures the person in a case where the drone collides with the other things such as the person.

Figure 26:
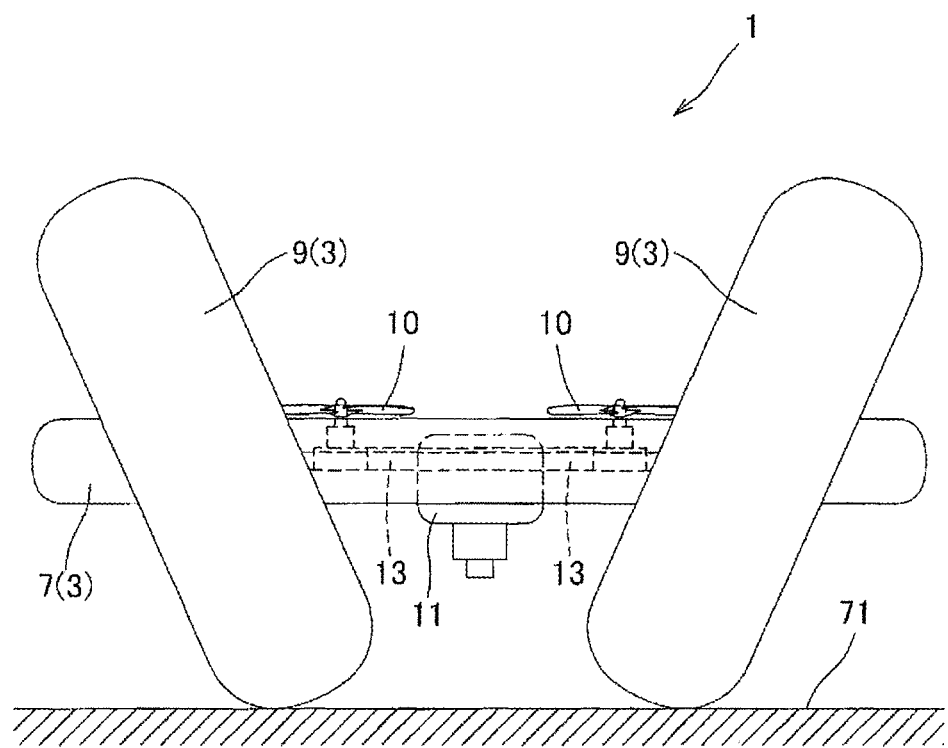
FIG. 26 is a front elevational view showing a drone with an airbag in which an inflated second airbag is provided so as to form a V-shaped form in right and left sides of a central mounting part.
Figure 27:
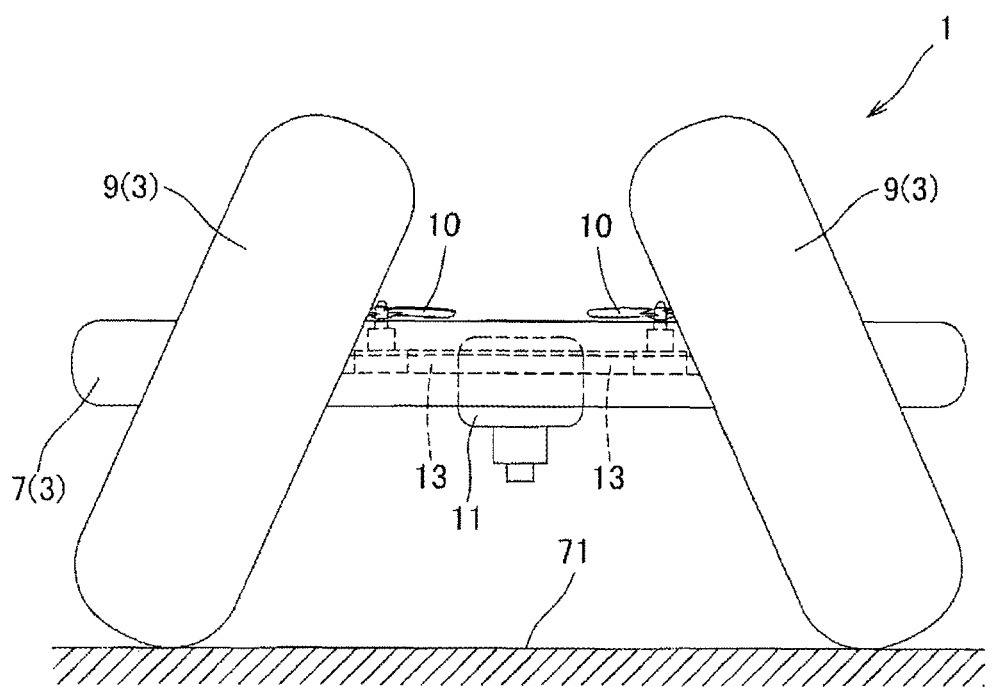
FIG. 27 is a front elevational view showing a drone with an airbag in which the inflated second airbag is provided so as to form an inverted-V shape in right and left sides of the central mounting part.
Figure 28:
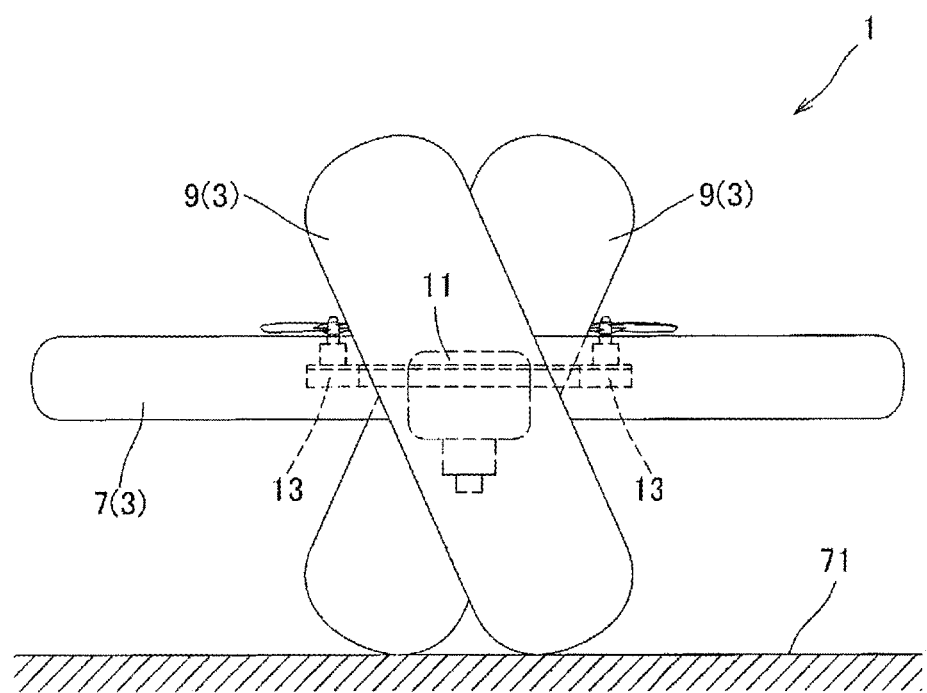
FIG. 28 is a front elevational view showing a drone with an airbag in which two inflated second airbags are provided so as to pinch the central mounting part in a crossing state.

(7) As shown in FIGS. 26 and 27, the second airbags 9 and 9 may be provided in such a manner as to form a V-shaped form (FIG. 26) or an inverted-V form (FIG. 27) in a front elevational view in their inflated state of surrounding the arm parts 13 and 13 in the surface which is inclined to the vertical plane in the right and left sides of the central mounting part 11. Alternatively, as shown in FIG. 28, the airbags may be structured such that two second airbags 9 are provided, two second airbags 9 and 9 in the inflated state are provided in such a manner as to pinch the central mounting part 11 in a crossing state, and each of the second airbags 9 and 9 is held by the second holding part 37 which is substantially provided in the central mounting part 11.

(8) FIG. 29A is a cross sectional view showing a state in which the first airbag 7 formed into a bellows shape and constructed foldable is held in a folded state by the first holding part 17. The first holding part 17 is bent in a direction that the upper piece 22 and the lower piece 23 face each other in the upper and lower ends of the base plate part 19, an accommodation part 25 is formed in an inner part thereof and the first airbag 7 is accommodated in the accommodation part 25. Further, FIG. 29B is a cross sectional view showing a state in which the first airbag 7 starts being inflated, and FIG. 9C is a cross sectional view showing a state in which the first airbag 7 is completely inflated. The first airbag 7 inflated as mentioned above is folded by a fold line 97 of the bellows by the discharge of the internal gas, and is accommodated in the first holding part 17 in the folded state shown in FIG. 29A.

Figure 30A:
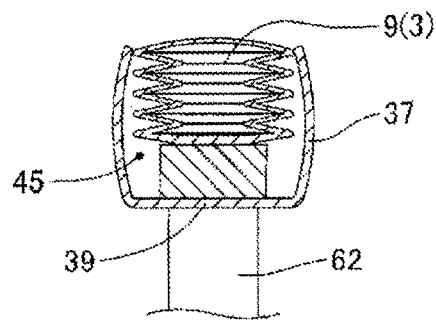
FIGS. 30A, 30B and 30C are cross sectional views showing a state in which a second airbag formed into a bellows shape and constructed foldable is held in a second holding part in a deflated state, and a process of the first airbag being inflated.
Figure 30B:
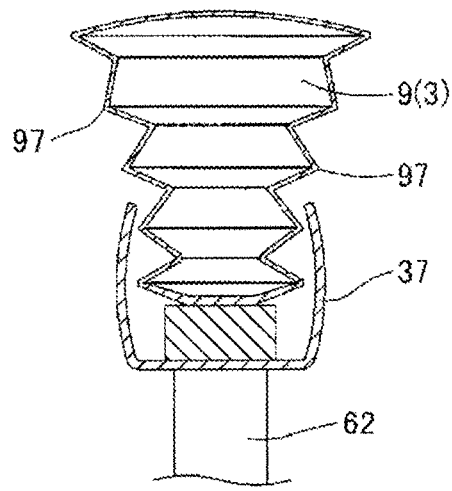
Figure 30C:
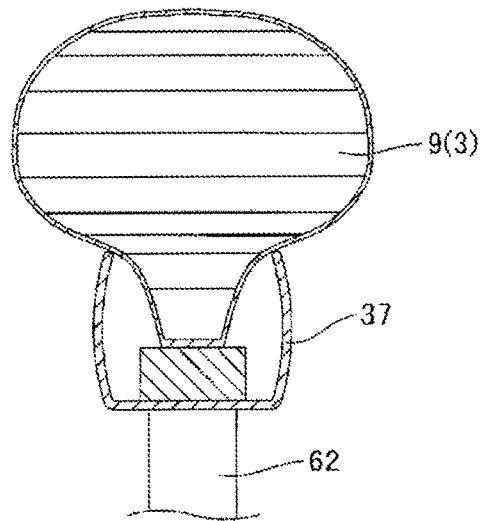

FIG. 30 is a cross sectional view showing a state in which the second airbag 9 is held in a folded state by the second holding part 37, can be inflated in the same manner as that in the first airbag 7, is folded by a fold line of the bellows by the discharge of the internal gas, and is accommodated in the second holding part 37.

(9) As the means for instantaneously inflating the first airbag 7 and the second airbag 9 in the folded state, it is possible to employ a means for inflating by using a simplified gas cylinder and a means for inflating by using an air feeding means constructed by a pump utilizing a motor, in addition to the means for inflating by using the inflator mentioned above.

(10) As a material of the airbag 3, it is possible to employ a sheet made of a resin material such as polyurethane, vinyl chloride and nylon, and a textile using the same and coated on an inner surface thereof with a resin for enhancing a gas tightness, in addition to the rubber mentioned above.

(11) In the first airbag 7, the first airbags 7 surrounding the drone 2 in the horizontal surface may be provided in plural stages at desired intervals in a vertical direction as long as the first airbag 7 allows the drone 2 to take off and land on the ground even in a state in which the airbag 3 is inflated, and can effectively prevent the danger that the drone 2 injures the person in a case where the drone 2 is crashed and collides with the other things such as the person and the building. Further, the second airbags 9 surrounding the drone in the vertical surface may be provided in plural columns at desired intervals in a horizontal direction.

(12) The control portion for inflating the first and second airbags 7 and 9 and the control portion for deflating them may be constructed by independent devices.

(13) The airbag 3 such as the first and second airbags 7 and 9 may be in an exposed state without being accommodated in the accommodation parts 25 and 45 in the deflated state thereof.

The invention claimed is:

1. A method of controlling a drone with an airbag in which the drone is provided with the airbag for absorbing a shock when the drone crashes or collides with an object, the method comprising the steps of:
    making the airbag be inflated by supplying a gas to the airbag prior to the drone taking off the ground;
    making the airbag in a deflated state by discharging the gas in the airbag after the drone reaches the predetermined attitude;
    making the airbag be inflated by supplying the gas to the airbag in the deflated state prior to the drone landing on the ground; and
    making the airbag be instantaneously inflated by supplying the gas to the airbag in the deflated state when a danger of the drone being crashed is generated during the flight of the drone.

2. A drone with an airbag, wherein the drone is provided with an airbag which absorbs a shock when the drone crashes or collides with an object, and a first inflation control portion and a second inflation control portion which control the inflation of the airbag,
    wherein the first inflation control portion includes a motor-driven pump and the second inflation control portion includes an inflator and a trigger device,
    wherein motor-driven pump is configured to supply a gas to the airbag and to inflate the airbag on the basis of a control of the first inflation control portion prior to the drone taking off from the ground, and further to discharge the gas in the airbag on the basis of the control of the first inflation control portion after the drone reaches a predetermined altitude, whereby the airbag is in the deflated state, and the gas is supplied to the airbag in the deflated state on the basis of the control of the first inflation control portion prior to the drone landing on the ground, and
    wherein during the flight of the drone, the inflator and trigger device are configured to inflate the airbag in the deflated state instantaneously by the gas supply on the basis of the control of the second inflation control portion, and the inflation on the basis of the control of the second inflation control portion is performed before the drone collides with the object.

3. A drone with an airbag, wherein the drone is provided with an airbag which absorbs a shock when the drone crashes or collides with an object, and a first inflation control portion and a second inflation control portion which control the inflation of the airbag,
    wherein the first inflation control portion includes a motor-driven pump and the second inflation control portion includes an inflator and a trigger device,
    wherein motor-driven pump is configured to supply a gas to the airbag and to inflate the airbag on the basis of a control of the first inflation control portion prior to the drone taking off from the ground, and further to discharge the gas in the airbag on the basis of the control of the first inflation control portion after the drone reaches a predetermined altitude, whereby the airbag is in the deflated state, and the gas is supplied to the airbag in the deflated state on the basis of the control of the first inflation control portion prior to the drone landing on the ground, and wherein during the flight of the drone, the inflator and trigger device are configured to inflate the airbag in the deflated state instantaneously by the gas supply on the basis of the control of the second inflation control portion, and the inflation on the basis of the control of the second inflation control portion is performed before the drone collides with the object, wherein the drone further comprises a pressure regulating means for regulating a pressure so as to prevent a gas pressure of the airbag from going beyond an allowable value in a case where the second inflation control portion is activated during the period when the first inflation control portion is activated.

4. The drone with the airbag according to claim 2, wherein the first inflation control portion includes a motor-driven pump, and is adapted to make the airbag be inflated on the basis of a gas supply action by the pump and make the airbag be deflated on the basis of a gas discharge action by the pump, and the second inflation control portion includes an inflator and a trigger device, and is adapted to make the airbag in the deflated state be instantaneously inflated on the basis of the gas supply from the inflator.

5. The drone with the airbag according to claim 2, wherein the airbag includes a first airbag which surrounds the drone in a horizontal surface, and a second airbag which surrounds the drone in a vertical surface, the first airbag and the second airbag are inflated simultaneously by the gas supply action on the basis of the control of the first inflation control portion or the second inflation control portion, and are deflated simultaneously by the gas discharge action on the basis of the control of the first inflation control portion.

6. A drone with an airbag, wherein the drone is provided with an airbag which absorbs a shock when the drone crashes or collides with an object, and a first inflation control portion and a second inflation control portion which control the inflation of the airbag, wherein the first inflation control portion includes a motor-driven pump and the second inflation control portion includes an inflator and a trigger device, wherein motor-driven pump is configured to supply a gas to the airbag and to inflate the airbag on the basis of a control of the first inflation control portion prior to the drone taking off from the ground, and further to discharge the gas in the airbag on the basis of the control of the first inflation control portion after the drone reaches a predetermined altitude, whereby the airbag is in the deflated state, and the gas is supplied to the airbag in the deflated state on the basis of the control of the first inflation control portion prior to the drone landing on the ground, and wherein during the flight of the drone, the inflator and trigger device are configured to inflate the airbag in the deflated state instantaneously by the gas supply on the basis of the control of the second inflation control portion, and the inflation on the basis of the control of the second inflation control portion is performed before the drone collides with the object, the airbag includes a first airbag which surrounds the drone in a horizontal surface, and a second airbag which surrounds the drone in a vertical surface, the second airbag includes right and left second airbags respectively arranged in each of right and left sides of the drone, and the right and left second airbags are rotatable in a clockwise direction or a counterclockwise direction around a vertical axis.

7. A drone with an airbag, wherein the drone is provided with an airbag which absorbs a shock when the drone crashes or collides with an object, and a first inflation control portion and a second inflation control portion which control the inflation of the airbag, wherein the first inflation control portion includes a motor-driven pump and the second inflation control portion includes an inflator and a trigger device, wherein motor-driven pump is configured to supply a gas to the airbag and to inflate the airbag on the basis of a control of the first inflation control portion prior to the drone taking off from the ground, and further to discharge the gas in the airbag on the basis of the control of the first inflation control portion after the drone reaches a predetermined altitude, whereby the airbag is in the deflated state, and the gas is supplied to the airbag in the deflated state on the basis of the control of the first inflation control portion prior to the drone landing on the ground, and wherein during the flight of the drone, the inflator and trigger device are configured to inflate the airbag in the deflated state instantaneously by the gas supply on the basis of the control of the second inflation control portion, and the inflation on the basis of the control of the second inflation control portion is performed before the drone collides with the object, the airbag only includes a first airbag which surrounds the drone in a horizontal surface, or includes the first airbag, and the first airbag is arranged in a plurality of stages at intervals in a vertical direction.

8. A drone with an airbag, wherein the drone is provided with an airbag which absorbs a shock when the drone crashes or collides with an object, and a first inflation control portion and a second inflation control portion which control the inflation of the airbag, wherein the first inflation control portion includes a motor-driven pump and the second inflation control portion includes an inflator and a trigger device, wherein motor-driven pump is configured to supply a gas to the airbag and to inflate the airbag on the basis of a control of the first inflation control portion prior to the drone taking off from the ground, and further to discharge the gas in the airbag on the basis of the control of the first inflation control portion after the drone reaches a predetermined altitude, whereby the airbag is in the deflated state, and the gas is supplied to the airbag in the deflated state on the basis of the control of the first inflation control portion prior to the drone landing on the ground, and wherein during the flight of the drone, the inflator and trigger device are configured to inflate the airbag in the deflated state instantaneously by the gas supply on the basis of the control of the second inflation control portion, and the inflation on the basis of the control of the second inflation control portion is performed before the drone collides with the object, the airbag only includes a second airbag which surrounds the drone in a vertical surface, or includes the second airbag, and the second airbag is arranged in a plurality of stages at intervals in a horizontal direction.

9. The drone with the airbag according to claim 3, wherein the pressure regulating means is adapted to stop the gas supply by the first inflation control portion.

10. The drone with the airbag according to claim 3, wherein the pressure regulating means is an automatic relief valve provided in the airbag.

11. The drone with the airbag according to claim 3, wherein the first inflation control portion includes a motor-driven pump, the pump being adapted to inflate the airbag to prevent injuries or damage if the drone collides with a person or object, and to deflate the airbag upon gas discharge by the pump, and wherein the second inflation control portion includes an inflator and a trigger device, and is adapted to instantaneously inflate the airbag when the airbag is in the deflated state on the basis of the gas supply from the inflator.

12. The drone with the airbag according to claim 3, wherein the airbag includes a first airbag which surrounds the drone in a horizontal surface, and a second airbag which surrounds the drone in a vertical surface, the first airbag and the second airbag are inflated simultaneously by a gas supply action on the basis of the control of the first inflation control portion or the second inflation control portion, and are deflated simultaneously by the gas discharge action on the basis of the control of the first inflation control portion.

\* \* \* \* \*